United States Patent
Rivero et al.

(10) Patent No.: US 12,552,209 B2
(45) Date of Patent: Feb. 17, 2026

(54) SYSTEMS AND METHODS OF MONITORING AND CONTROL FOR TRAILER DYNAMICS

(71) Applicant: TORC Robotics, Inc., Blacksburg, VA (US)

(72) Inventors: Armenio Rivero, Blacksburg, VA (US); Joseph Fox-Rabinovitz, Austin, TX (US); Christopher Harrison, Blacksburg, VA (US); Akshay Pai Raikar, Blacksburg, VA (US); Nicholas Atanasov, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 242 days.

(21) Appl. No.: 18/235,787

(22) Filed: Aug. 18, 2023

(65) Prior Publication Data

US 2025/0058593 A1 Feb. 20, 2025

(51) Int. Cl.
*B60D 1/24* (2006.01)
*B60D 1/62* (2006.01)
*G01M 1/12* (2006.01)

(52) U.S. Cl.
CPC .............. *B60D 1/248* (2013.01); *B60D 1/62* (2013.01); *G01M 1/122* (2013.01)

(58) Field of Classification Search
None
See application file for complete search history.

(56) References Cited

U.S. PATENT DOCUMENTS

| | | | |
|---|---|---|---|
| 6,223,114 B1 * | 4/2001 | Boros | B60T 8/17552 |
| | | | 701/72 |
| 7,209,221 B2 | 4/2007 | Breed et al. | |
| 7,359,782 B2 | 4/2008 | Breed | |
| 7,379,800 B2 | 5/2008 | Breed | |
| 7,783,403 B2 | 8/2010 | Breed | |
| 8,041,483 B2 | 10/2011 | Breed | |
| 8,044,776 B2 | 10/2011 | Schofield et al. | |
| 8,447,474 B2 | 5/2013 | Breed | |
| 8,948,955 B2 | 2/2015 | Zhu et al. | |
| 9,711,051 B2 | 7/2017 | Segarra | |

(Continued)

FOREIGN PATENT DOCUMENTS

| | | |
|---|---|---|
| EP | 2338029 B1 | 5/2017 |
| WO | 2018106812 A1 | 6/2018 |

OTHER PUBLICATIONS

Advanced Navigation, "Inertial Measurement Unit (IMU)—An Introduction," Mar. 27, 2023. (Year: 2023).

*Primary Examiner* — Daniel L Greene
(74) *Attorney, Agent, or Firm* — Armstrong Teasdale LLP

(57) ABSTRACT

Detection of trailer dynamic parameters is provided. A vehicle can receive a geometry of a plurality of points of support disposed along a longitudinal axis of the trailer. The vehicle can determine a center of mass of the trailer based on the plurality of points of support and weights bearing down thereupon. The vehicle can bound or otherwise determine, based on the geometry of the plurality of points of support and the center of mass, a moment of inertia of the trailer about at least one of the plurality of points of support. The vehicle can perform a navigational action based on the moment of inertia or center of mass.

18 Claims, 13 Drawing Sheets

(56) References Cited

U.S. PATENT DOCUMENTS

| | | | |
|---|---|---|---|
| 9,898,005 B2 | 2/2018 | Mei et al. | |
| 10,109,186 B2 | 10/2018 | Blekken et al. | |
| 10,300,926 B2 | 5/2019 | Cullinane et al. | |
| 10,504,363 B2 | 12/2019 | Blekken et al. | |
| 10,800,406 B2 | 10/2020 | Awamori et al. | |
| 11,004,000 B1 | 5/2021 | Gutmann et al. | |
| 11,106,218 B2 | 8/2021 | Levinson et al. | |
| 12,116,009 B2 | 10/2024 | Jatt et al. | |
| 12,181,873 B2 | 12/2024 | Switkes et al. | |
| 2004/0075298 A1 | 4/2004 | Wong et al. | |
| 2004/0148057 A1 | 7/2004 | Breed et al. | |
| 2005/0195383 A1 | 9/2005 | Breed et al. | |
| 2005/0278098 A1 | 12/2005 | Breed | |
| 2007/0182528 A1 | 8/2007 | Breed et al. | |
| 2008/0079237 A1* | 4/2008 | Rubin | B62D 37/06 280/432 |
| 2008/0119993 A1 | 5/2008 | Breed | |
| 2010/0198492 A1* | 8/2010 | Watanabe | G01G 23/3728 701/124 |
| 2014/0277942 A1 | 9/2014 | Kyrtsos et al. | |
| 2015/0020583 A1 | 1/2015 | McClenahan et al. | |
| 2016/0041258 A1 | 2/2016 | Cashler et al. | |
| 2016/0260323 A1 | 9/2016 | Blekken et al. | |
| 2016/0274228 A1 | 9/2016 | Cashler | |
| 2016/0284213 A1 | 9/2016 | Cao et al. | |
| 2016/0368336 A1 | 12/2016 | Kahn et al. | |
| 2018/0011172 A1 | 1/2018 | Cashler et al. | |
| 2018/0045823 A1 | 2/2018 | Prasad et al. | |
| 2019/0019406 A1 | 1/2019 | Blekken et al. | |
| 2019/0170867 A1 | 6/2019 | Wang et al. | |
| 2019/0179010 A1 | 6/2019 | Nasser et al. | |
| 2019/0285501 A1* | 9/2019 | Jensen | B60T 8/1708 |
| 2019/0302764 A1 | 10/2019 | Smith et al. | |
| 2020/0183008 A1* | 6/2020 | Chen | G01S 17/88 |
| 2020/0341118 A1* | 10/2020 | Chen | G05D 1/0088 |
| 2021/0197815 A1 | 7/2021 | Pitzer | |
| 2022/0187420 A1 | 6/2022 | Cole et al. | |
| 2022/0244737 A1 | 8/2022 | Grossman et al. | |
| 2023/0001955 A1 | 1/2023 | Switkes et al. | |
| 2023/0004158 A1 | 1/2023 | Switkes et al. | |
| 2023/0052355 A1 | 2/2023 | Burnette et al. | |
| 2023/0114328 A1 | 4/2023 | Tan et al. | |
| 2023/0123587 A1 | 4/2023 | Jatt et al. | |
| 2024/0101099 A1 | 3/2024 | Laine et al. | |
| 2024/0151547 A1 | 5/2024 | Stout, II et al. | |
| 2024/0255636 A1 | 8/2024 | Kolasinski et al. | |
| 2024/0317003 A1 | 9/2024 | Bechtel et al. | |
| 2024/0353557 A1 | 10/2024 | Eix et al. | |
| 2024/0393455 A1 | 11/2024 | Ghannam et al. | |
| 2025/0018976 A1 | 1/2025 | Jatt et al. | |
| 2025/0058593 A1 | 2/2025 | Rivero et al. | |
| 2025/0058779 A1 | 2/2025 | Fox-Rabinovitz et al. | |
| 2025/0060454 A1 | 2/2025 | Fox-Rabinovitz et al. | |
| 2025/0091614 A1 | 3/2025 | Switkes et al. | |
| 2025/0093872 A1 | 3/2025 | Switkes et al. | |

* cited by examiner

1000

1002
Receive, from a time-of-flight sensor, data indicative of a first wheel assembly in a field of view of the time-of-flight sensor

1004
Determine a distance to a portion of the trailer from the data

1006
Determine a doppler shift indicative of a speed of a wheel of the first wheel assembly from the data

1008
Determine based on the distance and the doppler shift, a wheelbase of the trailer.

FIG. 10

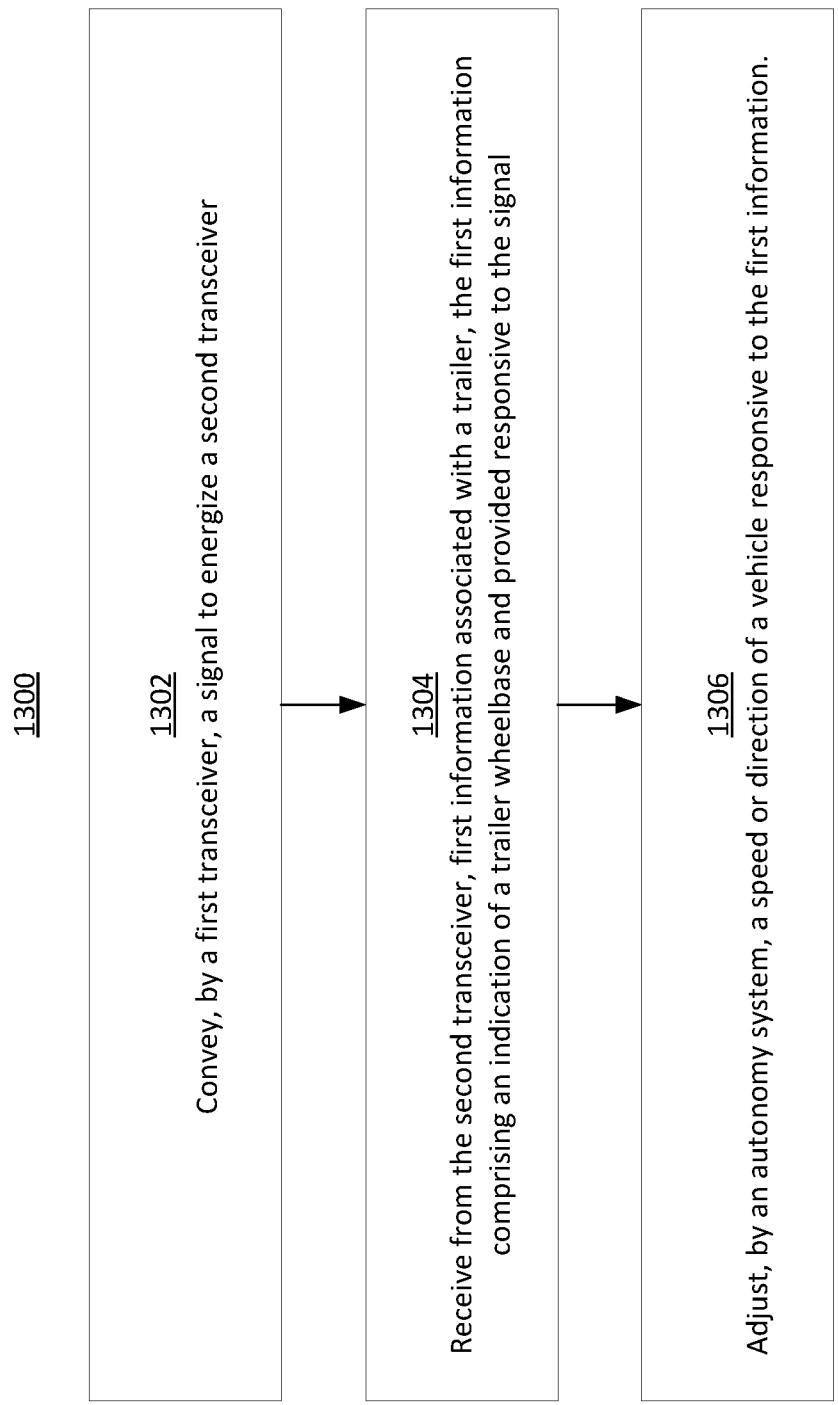

SYSTEMS AND METHODS OF MONITORING AND CONTROL FOR TRAILER DYNAMICS

TECHNICAL FIELD

The present disclosure relates generally to vehicle handling and, more specifically, observation of trailer dynamics parameters.

BACKGROUND

The use of autonomous vehicles has become increasingly prevalent in recent years, with the potential for numerous benefits. Trailered vehicle operation can vary according to a positioning of a load within a trailer. For example, trailers may exhibit increased sway or instability for loads placed at the back of the trailer, which may be referred to as rearward bias. Rearward bias can reduce vehicle stability, alter handling, or impact a load placed onto trailer axles which may affect braking, dynamic stresses, or other vehicle performance attributes. A human-crewed vehicle may detect rearward biased trailers by observing loads stowed within the trailer, or based on kinematic properties such as trailer sway or difficulty steering. However, such a detection mechanism may be inadequate to quantify the dynamics, for ingestion by a vehicle control system. Moreover, a mass distribution may impact axle loading of various axles of a trailer which may cause the load borne by one or more axles to exceed a design, regulatory, or other limit. Further, a human crew may detect such a condition based on information not immediately available to a vehicle control system of an autonomous vehicle.

SUMMARY

According to the systems and methods disclosed herein, an autonomous vehicle can determine a loading configuration of a trailer coupled thereto. For example, the autonomous vehicle can receive an indication of a turn rate of the trailer, and determine the center of mass (or a deviation from an expected range thereof), or a moment of inertia about one or more points of support according to the vehicle response relative to a model. To employ such a model, the vehicle can compare the position of the wheels of the towing vehicle, and the wheels of the trailer which can be defined, relative to the autonomous vehicle, according to a coupling angle between the towing vehicle and the trailer, and a distance from a coupling point to the trailer wheels. The systems and methods disclosed herein can determine the distance to the wheels or the coupling angle between the vehicle and the trailer. In some embodiments, the autonomous vehicle can include a sensor to determine a distance measurement such as a distance sensor such as a radar or Light Detection And Ranging (LiDAR) system, (e.g., doppler LiDAR), to monitor a left or right side of the vehicle. Such a sensor can be opportunistically sampled to determine a wheel distance or trailer coupling angle (e.g., according to the wheel distance, side panel angle, or other detections of the trailer). For example, while turning the vehicle at a loading dock or on a roadway, the trailer wheel assemblies can enter a field of view of a side facing distance sensor. Moreover, while navigating a corner or experiencing trailer sway, such wheel assemblies or trailer side panels may further enter a field of view of the side facing distance sensor.

The vehicle can perform various actions responsive to the determinations of the determination of the trailer loading dynamics. For example, responsive to a large magnitude moment of inertia, the vehicle can navigate corners or other roadway portions under a speed restriction, select a route based on the moment of inertia, convey an indication of the trailer loading (e.g., to another autonomous vehicle intended to receive the trailer or to a loading dock system to re-orient the load). Responsive to a detection of a trailer loading, the vehicle can report an estimated load borne by one or more axles, or execute a navigational action (e.g., slow at reduced speed or turn rate, or bring the vehicle to a halt).

An embodiment of the present disclosure is directed to a vehicle. The vehicle can include a distance sensor coupled to the vehicle. The vehicle can include a trailer rotatably coupled to a tractor of the vehicle. The vehicle can include one or more processors. The one or more processors can receive, from the distance sensor, data indicative of a first wheel assembly in a field of view of the distance sensor. The one or more processors can determine a distance to a portion of the trailer from the data. The one or more processors can determine a doppler shift indicative of a speed of a wheel of the first wheel assembly from the data. The one or more processors can determine, based on the distance and the doppler shift, a wheelbase of the trailer.

Another embodiment of the present disclosure is directed to a method. The method may be performed by one or more processors. The method includes receiving, from a distance sensor, data indicative of a first wheel assembly in a field of view of the distance sensor. The method includes determining a distance to a portion of the trailer from the data. The method includes determining a doppler shift indicative of a speed of a wheel of the first wheel assembly from the data. The method includes determining based on the distance and the doppler shift, a wheelbase of the trailer.

Another embodiment of the present disclosure is directed to a system. The system can include a tractor having a coupling unit receiver and a data processing system. The data processing system can be communicatively coupled to a sensor configured to determine a distance from the coupling unit receiver to a wheel assembly of a trailer and a doppler shift indicative of a speed of the wheel assembly. The tractor can include an autonomy system configured to control a speed or direction of the tractor based on the distance, and the doppler shift. The system can include the trailer. The trailer can include a coupling unit configured for receipt by the coupling unit receiver, and the wheel assembly.

Another embodiment of the present disclosure is directed to a vehicle. The vehicle can include one or more processors. The one or more processors can receive a mass distribution for the vehicle. The mass distribution can include a mass of a tractor of the vehicle. The mass distribution can include a mass of a trailer of the vehicle. The mass distribution can include a load mass. The one or more processors can receive a geometry of a plurality of points of support disposed along a longitudinal axis of the trailer. The one or more processors can determine a center of mass of the trailer based on the plurality of points of support. The one or more processors can determine, based on the geometry of the plurality of points of support and the center of mass, a moment of inertia of the trailer about at least one of the plurality of points of support. The one or more processors can perform a navigational action based on the moment of inertia.

Another embodiment of the present disclosure is directed to a method. The method may be performed by a data processing system. The method includes receiving a mass distribution for a vehicle. The mass distribution can include a mass of a tractor of the vehicle. The mass distribution can include a mass of a trailer of the vehicle. The mass distribution can include a load mass. The method includes receiving a geometry of a plurality of points of support disposed along a longitudinal axis of the trailer. The method includes determining a center of mass of the trailer based on the plurality of points of support. The method includes determining based on the geometry of the plurality of points of support and the center of mass, a moment of inertia of the trailer about at least one of the plurality of points of support. The method includes performing, by the data processing system, a navigational action based on the moment of inertia.

Another embodiment of the present disclosure is directed to a system. The system can include a data processing system. The data processing system can store a mass distribution for a tractor. The tractor mass distribution can include a fixed portion of the mass of the tractor. The tractor mass distribution can include a first variable portion of the mass of the tractor associated with a combustible fuel. The tractor mass distribution can include a second variable portion of the mass of the tractor associated with an occupant 338 thereof. The data processing system can store a mass distribution for a trailer. The trailer mass distribution can include a fixed portion of the mass of the trailer. The trailer mass distribution can include a variable portion of the mass of the trailer corresponding to a load.

Another embodiment of the present disclosure is directed to a vehicle. The vehicle can include a rotatable coupler configured to interface with a trailer. The vehicle can include a distance sensor coupled to the vehicle and configured to detect an indication of a position of the trailer engaged with the rotatable coupler, the position comprising a wheel assembly. The vehicle can include one or more processors. The one or more processors can receive, from the distance sensor, the indication of the position of the wheel assembly. The one or more processors can determine a rotation of the rotatable coupler. The one or more processors can determine a centerline distance from the rotatable coupler to the wheel assembly.

Another embodiment of the present disclosure is directed to a method. The method may be performed by a data processing system. The method includes receiving, from a distance sensor coupled to a vehicle and configured to detect an indication of a position of a trailer engaged with a rotatable coupler, the position comprising a wheel assembly. The method includes determining, by the data processing system, a rotation of the rotatable coupler based on the position. The method includes determining, by the data processing system, a centerline distance from the rotatable coupler to the wheel assembly of the trailer.

Another embodiment of the present disclosure is directed to a system. The system can include a tractor. The tractor can include a coupling unit receiver. The tractor can include a sensor configured to determine a distance from the coupling unit receiver to a wheel assembly of a trailer, and a coupling angle between the coupling unit receiver and a coupling unit of the trailer. The tractor can include an autonomy system configured to control a speed or direction of the tractor based on the coupling angle or distance. The system can include a trailer. The trailer can include the coupling unit configured for receipt by the coupling unit receiver. The trailer can include the wheel assembly.

Another embodiment of the present disclosure is directed to a vehicle. The vehicle can include one or more first memory devices. The vehicle can include a first transceiver configured to communicate with a device coupled to a trailer rotatably coupled to the vehicle, the device comprising a second transceiver and a second memory device. The vehicle can include one or more processors. The one or more processors can cause the first transceiver to convey a signal to energize the second transceiver. The one or more processors can receive, from the second transceiver, first information associated with the trailer. The first information can include an indication of a trailer wheelbase.

Another embodiment of the present disclosure is directed to a method. The method may be performed by a data processing system. The method includes conveying, by a first transceiver, a signal to energize a second transceiver. The method includes receiving, from the second transceiver, first information associated with a trailer, the first information comprising an indication of a trailer wheelbase and provided responsive to the signal. The method includes adjusting, by an autonomy system, a speed or direction of a vehicle responsive to the first information.

Another embodiment of the present disclosure is directed to a system. The system can include a trailer. The trailer can include a coupling unit configured for receipt by a coupling unit receiver. The trailer can include a wheel assembly. The trailer can include a first transceiver coupled to a first memory, the first memory comprising an indication of a trailer wheelbase. The system can include a tractor. The tractor can include the coupling unit receiver. The tractor can include a second transceiver configured to communicatively couple with the first transceiver to receive the indication of the trailer wheelbase therefrom, when the coupling unit is received by the coupling unit receiver. The tractor can include an autonomy system configured to control a speed or direction of the tractor based on the trailer wheelbase.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

FIG. 10 is a flow diagram of an example method of trailer wheelbase determination, according to an embodiment.

FIG. 11 is a flow diagram of an example method of trailer mass distribution determination, according to an embodiment.

FIG. 13 is a flow diagram of an example method of vehicle operation based on trailer identification, according to an embodiment.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Figure 1:
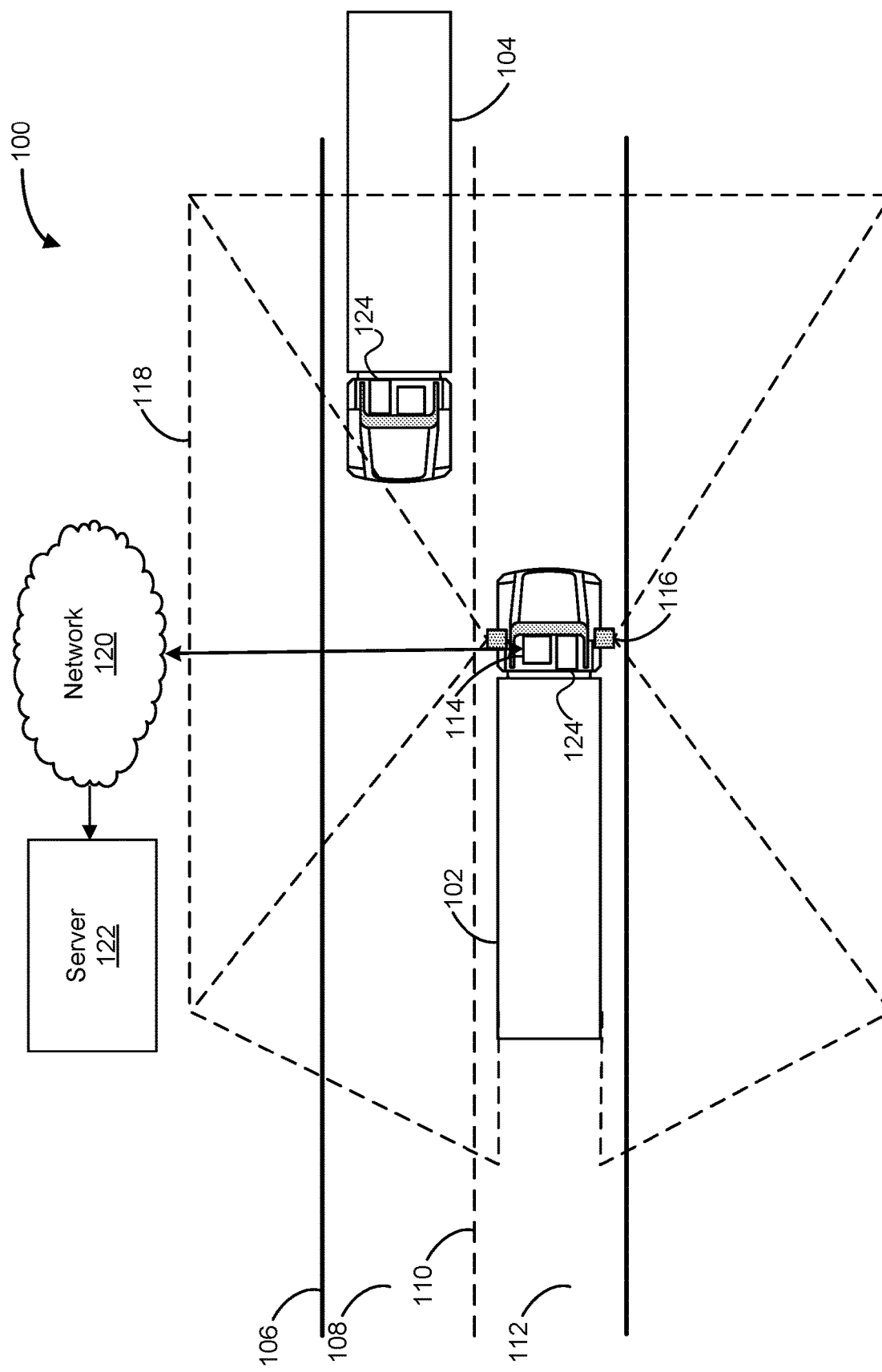
FIG. 1 is a bird's-eye view of a roadway including a schematic representation of a vehicle and aspects of an autonomy system of the vehicle, according to an embodiment.

Referring to FIG. 1, the present disclosure may relate to autonomous vehicles, such as an autonomous vehicle 102 having an autonomy system 114. The autonomy system 114 of the vehicle 102 may be completely autonomous (fully autonomous), such as self-driving, driverless, or Level 4 autonomy, or semi-autonomous, such as Level 3 autonomy. Some embodiments, of the present disclosure may be employed with non-autonomous vehicles (e.g., level 0 vehicles). As used herein the term "autonomous" includes both fully autonomous and semi-autonomous. The autonomy system 114 may be structured on at least three aspects of technology: (1) perception, (2) maps/localization, and (3) behaviors planning and control. The function of the perception aspect is to sense an environment surrounding the vehicle 102 and interpret the environment. To interpret the surrounding environment, a perception module 116 or engine in the autonomy system 114 of the vehicle 102 may identify and classify objects or groups of objects in the environment. For example, a perception module 116 may be associated with various sensors (e.g., light detection and ranging (LiDAR), camera, radar, etc.) of the autonomy system 114 and may identify one or more objects (e.g., pedestrians, vehicles, debris, etc.) and features of the roadway (e.g., lane lines) around the vehicle 102, and classify the objects in the road distinctly. The perception module 116 may determine a presence of other vehicles, or foreign objects and debris along a roadway.

The perception module 116 may further determine a disposition of portions of the autonomous vehicle 102. For example, the perception module 116 can detect a type, position, dimension, or other characteristic of a trailer or load carried thereby. Such detection may be via dedicated sensors of the perception module 116 to detect a trailer position or weight (e.g., scales, strain gages, or so forth). Such detection may be sensors of the perception module 116 employed to detect other vehicles 104 on the roadway. For example, the perception module 116 can include or interface with a side facing sensor such a LiDAR, radar emitter/sensor pair or another distance sensor to detect other vehicles 104, and have a field of view including the trailer (e.g., at all times, or under certain conditions such as turns wherein an angle of a rotatable coupler between the tractor and the trailer exceed a threshold angle). References to such distance sensors can include various sensor types. For example, in some embodiments, visible light or other cameras (e.g., fisheye lensed cameras or stereo cameras), doppler LiDAR systems, time-of-flight sensors, or other distance sensors can monitor a left and right side of an autonomous vehicle 102 and further detect a trailer position.

The maps/localization aspect of the autonomy system 114 may be configured to determine where on a pre-established digital map the vehicle 102 is currently located. One way to do this is to sense the environment surrounding the vehicle 102 (e.g., via the perception module 116), such as by detecting vehicles (e.g., a vehicle 104) or other objects (e.g., traffic lights, speed limit signs, pedestrians, signs, road markers, etc.) from data collected via the sensors of the autonomy system 114, and to correlate features of the sensed environment with details (e.g., digital representations of the features of the sensed environment) on the digital map.

Once the systems on the vehicle 102 have determined the location of the vehicle 102 with respect to the digital map features (e.g., location on the roadway, upcoming intersections, road signs, etc.), the vehicle 102 can plan and execute maneuvers and/or routes with respect to the features of the digital map. The behaviors, planning, and control aspects of the autonomy system 114 may be configured to make decisions about how the vehicle 102 should move through the environment to get to the goal or destination of the vehicle 102. The autonomy system 114 may consume information from the perception and maps/localization modules to know where the vehicle 102 is relative to the surrounding environment and what other objects and traffic actors are doing.

FIG. 1 further illustrates an environment 100 for modifying one or more actions of the vehicle 102 using the autonomy system 114. The vehicle 102 is capable of communicatively coupling to a remote server 122 via a network 120. The vehicle 102 may not necessarily connect with the network 120 or the server 122 while it is in operation (e.g., driving down the roadway). That is, the server 122 may be remote from the vehicle, and the vehicle 102 may deploy with all the necessary perception, localization, and vehicle control software and data necessary to complete the vehicle 102's mission fully autonomously or semi-autonomously. The vehicle can convey indications of a status to the remote server 122, such as an indication that the autonomous vehicle 102 has been loaded improperly or shifted during transit, which may limit the operation of the vehicle above certain speeds, turning rates, braking rates, or so forth. The server 122 can schedule or dispatch a service to reconfigure loads, or schedule the autonomous vehicle 102 for arrival at another (e.g., later) time responsive to the detected load.

While this disclosure refers to a vehicle 102 as the autonomous vehicle, it is understood that the vehicle 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality. While the perception module 116 is depicted as being located at the front of the vehicle 102, the perception module 116 may be a part of a perception system with various sensors placed at different locations throughout the vehicle 102, such as to include forward facing, side, or rear facing cameras or distance sensors.

Figure 2:
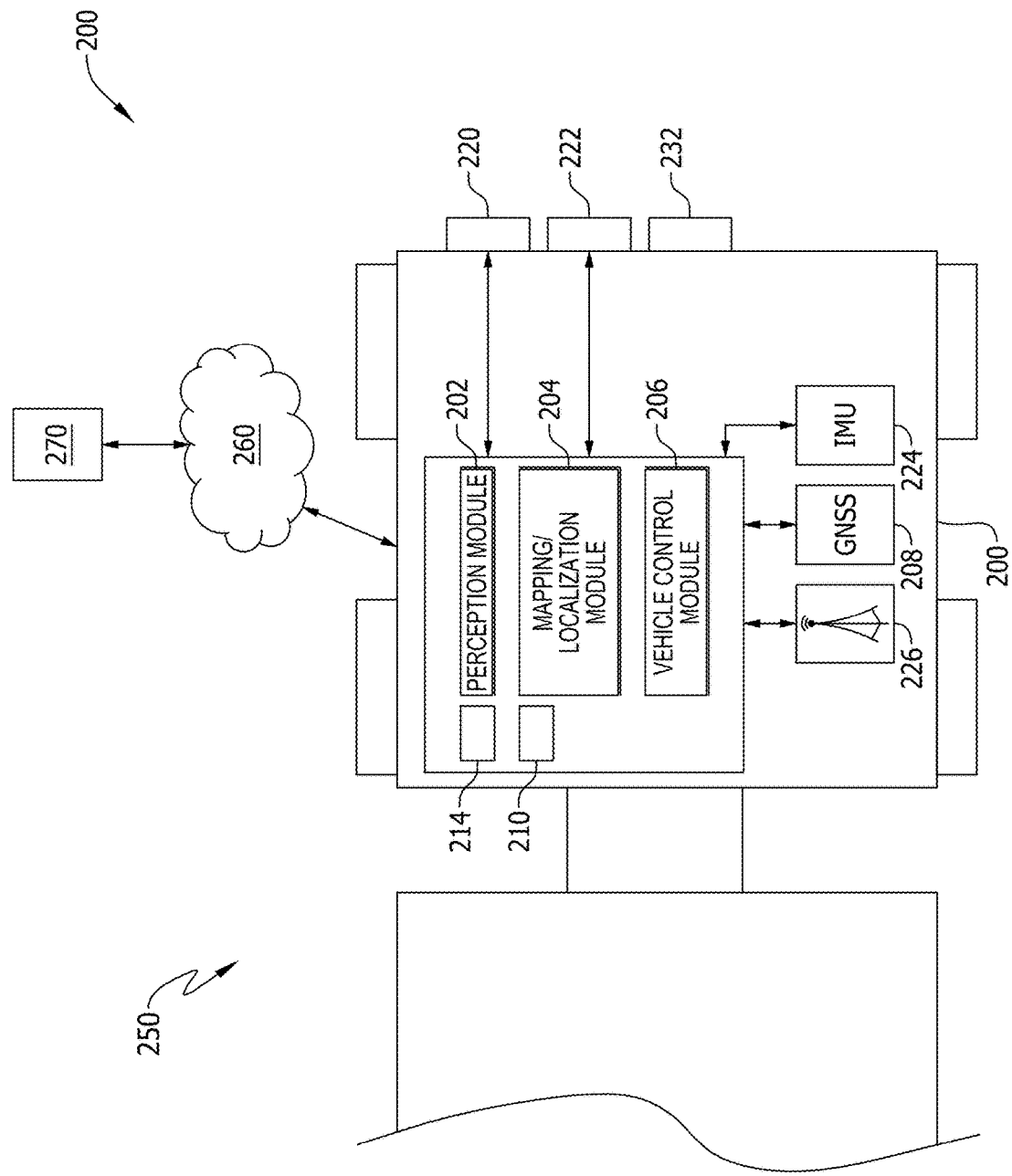
FIG. 2 is a system for determining deviations between observed and expected trajectories of vehicles, according to an embodiment.

FIG. 2 illustrates an example schematic of an autonomy system 250 of a vehicle 200, according to some embodiments. The autonomy system 250 may be the same as or similar to the autonomy system 114 depicted in FIG. 1. The vehicle 200 may be the same as or similar to the vehicle 102. The autonomy system 250 may include a perception system including a camera system 220, a LiDAR system 222, a radar system 232, a Global Navigation Satellite System (GNSS) receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include additional, fewer, or different components or systems, and each of the components or system(s) may include additional, fewer, or different components. Additionally, the systems and components shown may be combined or divided in various ways. As shown in FIG. 1, the perception systems aboard the autonomous vehicle may help the vehicle 102 perceive the vehicle 102's environment out to a perception area 118. The actions of the vehicle 102 may depend on the extent of the perception area 118. The perception area 118 can include one or more field of views of various sensors. It is to be understood that the perception area 118 is an example area, and the practical area may be greater than or less than what is depicted. For example, the perception area 118 can include portions of the trailer, such as at all times, or when a coupling angle between the trailer and the tractor exceeds a threshold angle. The perception system can include or interface with various components of the present disclosure, such as the data processing system 902 described henceforth with regard to FIG. 9.

The camera system 220 of the perception system may include one or more cameras mounted at any location on the vehicle 102, which may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102) or may surround 360 degrees of the vehicle 102. In some embodiments, the FOV may include a front, rear, wheel assembly, or other portion of a trailer. In some embodiments, the image data generated by the camera system(s) 220 may be sent to the perception module 202 and stored, for example, in memory 214.

The LiDAR system 222 may include a laser generator and a detector and can send and receive LiDAR signals. A LiDAR signal can be emitted to and received from any direction such that LiDAR point clouds (or "LiDAR images") of the areas ahead of, to the side, and behind the vehicle 200 can be captured and stored as LiDAR point clouds. In some embodiments, the vehicle 200 may include multiple LiDAR systems and point cloud data from the multiple systems that may be stitched together.

The radar system 232 may include short-range radar (SRR), mid-range radar (MRR), or long-range radar (LRR). One or more sensors may emit radio waves, and a processor may process received reflected data (e.g., raw radar sensor data) from the emitted radio waves.

The camera system 220 (e.g., stereo camera system 220), LiDAR system 222, radar system 232, or other components of the perception module can receive range rate information indicative of a speed of an object including a portion of the autonomous vehicle 102. For example, another vehicle 104 traveling at 60 miles per hour overtaking the autonomous vehicle 102 traveling at 55 miles per hour can reflect range rate information indicative of a 5 mile per hour range rate speed (that is, a speed differential between the sensor and the detected vehicle 104). A trailer may indicate a speed of zero when moving in tandem with a tractor, or another speed (e.g., 0.2 miles per hour) when swaying. A wheel assembly of the trailer may indicate a speed relative to the vehicle (e.g., a reflection from an outer surface of a tire can include range rate information indicative of a 55 mile per hour range rate speed).

In some embodiments, the system inputs from the camera system 220, the LiDAR system 222, and the radar system 232 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the vehicle 200 (or object(s) therein). In some embodiments, the point cloud may be rendered as one or more polygon(s) or mesh model(s) through, for example, surface reconstruction. Collectively, the radar system 232, the LiDAR system 222, and the camera system 220 may be referred to herein as "imaging systems" along with ultrasonics or other distance sensors, or the like.

One or more GNSS receivers 208 may be positioned on the vehicle 200 and may be configured to determine a location of the vehicle 200 via GNSS data, as described herein. The GNSS receiver 208 may be configured to receive one or more signals from a global navigation satellite system (GNSS) (e.g., a GPS) to localize the vehicle 200 via geolocation. The GNSS receiver 208 may provide an input to and otherwise communicate with the mapping/localization module 204 to, for example, provide location data for use with one or more digital maps, such as an HD map (e.g., in a semantic map, in a raster layer or other vector layer, etc.).

The inertial measurement unit (IMU) 224 may be an electronic device that measures and reports one or more features regarding the motion of the vehicle 200. For example, the IMU 224 may measure or be employed, in combination with further sensor data, to determine a velocity, acceleration, angular rate, and/or an orientation of the vehicle 200 or one or more of the vehicle 200's individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the vehicle 200 and predict a location of the vehicle 200 even when the GNSS receiver 208 cannot receive satellite signals. In some embodiments, the IMU 224 can determine a trailer position or travel based on the various systems and methods disclosed herein.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.). In some embodiments, the transceiver 226 may be configured to communicate with external network(s) via a wired connection, such as, for example, during initial installation, testing, or service of the autonomy system 250 of the vehicle 200. A wired/wireless connection may be used to download and install various lines of code in the form of digital files (e.g., HD digital maps), executable programs (e.g., navigation programs), and other computer-readable code that may be used by the system 250 to navigate the vehicle 200 or otherwise operate the vehicle 200, either fully autonomously or semi-autonomously. The transceiver 226 may interface with one or more corresponding transceivers, such as a transceiver of the remote sever 122, an RFID or NFC tag of a trailer, or so forth.

The processor 210 of autonomy system 250 may be embodied as one or more of a data processor, a microcontroller, a microprocessor, a digital signal processor, a logic circuit, a programmable logic array (e.g., a field programmable gate array (FPGA), complex programmable logic device (CPLD), or the like), or one or more other devices for controlling the autonomy system 250 in response to one or more of the system inputs. The autonomy system 250 may include a single microprocessor or multiple microprocessors that may include means for controlling the vehicle 200 to switch lanes and monitoring and detecting other vehicles. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote to the vehicle 200. Various other known circuits may be associated with the autonomy system 250, including signal-conditioning circuitry, communication circuitry, actuation circuitry, and other appropriate circuitry.

The memory 214 of the autonomy system 250 may store data and/or software routines that may assist the autonomy system 250 in performing autonomy system 250's functions, such as the functions of the perception module 202, the mapping/localization module 204, the vehicle control module 206, and the methods 1000, 1100, 1200, and 1300 described herein with respect to FIGS. 10, 11, 12 and 13. Further, the memory 214 may also store data received from various inputs associated with the autonomy system 250, such as perception data from the perception system. Such instructions can be stored, cached, or retrieved from various transitive or non-transitive media. For example, the processor 210 can retrieve the instructions from a non-transitive media (e.g., NAND or NOR FLASH, magnetic media, or a read only memory) to execute the instructions. Execution of the instructions can include loading the instructions to another memory (e.g., RAM, including volatile or non-volatile RAM) prior to executing other of the instructions.

As noted above, the perception module 202 may receive input from the various sensors, such as the camera system 220, the LiDAR system 222, the GNSS receiver 208, and/or the IMU 224 (collectively "perception data") to sense an environment surrounding the vehicle 200 (or portions of the vehicle 200) and interpret it. To interpret the surrounding environment or vehicle 200, the perception module 202 (or "perception engine") may identify and classify objects or groups of objects in the environment. For example, the vehicle 102 may use the perception module 202 to identify one or more objects (e.g., pedestrians, vehicles, debris, etc.) or features of the roadway 106 (e.g., intersections, road signs, lane lines, etc.) before or beside a vehicle and classify the objects in the road. In some embodiments, the perception module 202 may include an image or video classification function and/or a computer vision function. In some embodiments, the perception module 202 can classify a portion of a detected trailer, such as a rear wall, a wheel assembly, or so forth.

The system 250 may collect perception data. The perception data may represent the perceived environment surrounding the vehicle, for example, and may be collected using aspects of the perception system described herein. The perception data can come from, for example, one or more of the LiDAR system, the camera system, the radar system and various other sensors and systems on board the vehicle (e.g., the GNSS receiver, etc.). For example, in vehicles having a LiDAR or radar system, the LiDAR and/or radar systems may collect perception data. As the vehicle 102 travels along the roadway 106, the system 250 may continually receive data from the various systems on the vehicle 102. In some embodiments, the system 250 may receive data periodically and/or continuously. With respect to FIG. 1, the vehicle 102 may collect perception data that indicates the presence of the lane line 110 (e.g., in order to determine the lanes 108 and 112). Additionally, the detection systems may detect the vehicle 104 and monitor the vehicle 104 to estimate various properties of the vehicle 104 (e.g., proximity, speed, behavior, flashing light, etc.). The properties of the vehicle 104 may be stored as time-series data in which timestamps indicate the times in which the different properties were measured or determined. The features may be stored as points (e.g., vehicles, signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 250 interacts with the various features.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., the LiDAR system 222) that does not include the camera data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the vehicle 200 (e.g., lane lines). The computer vision function may use, for example, an object recognition algorithm, video tracking, one or more photogrammetric range imaging techniques (e.g., structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of the vehicle 200's motion, size, etc.)

The mapping/localization module 204 receives image data that can be compared to one or more digital maps stored in the mapping/localization module 204 to determine where the vehicle 200 is in the world and/or where the vehicle 200 is on the digital map(s). In particular, the mapping/localization module 204 may receive perception data from the perception module 202 and/or from the various sensors sensing the environment surrounding the vehicle 200 and correlate features of the sensed environment with details (e.g., digital representations of the features of the sensed environment) on the one or more digital maps. The digital map may have various levels of detail and can be, for example, a raster map, a vector map, etc. The digital maps may be stored locally on the vehicle 200 and/or stored and accessed remotely.

The vehicle control module 206 may control the behavior and maneuvers of the vehicle 200. For example, once the systems on the vehicle 200 have determined the vehicle 200's location with respect to map features (e.g., intersections, road signs, lane lines, etc.) the vehicle 200 may use the vehicle control module 206 and the vehicle 200's associated systems to plan and execute maneuvers and/or routes with respect to the features of the environment. The vehicle control module 206 may make decisions about how the vehicle 200 will move through the environment to get to the vehicle 200's goal or destination as it completes the vehicle 200's mission. The vehicle control module 206 may consume information from the perception module 202 and the mapping/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the vehicle 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the vehicle 200.

The control module 206 can receive indications of operation from the one or more systems, and convey such indications to other vehicle 200 subsystems. For example, the control module 206 can receive an indication of trailer weight, and weight distribution including an inertial moment around a rotatable support points such as a kingpin or wheel. The control module 206 can engage the propulsion, steering, or braking systems of the vehicle 200 responsive to such indications.

The steering system may be any combination of mechanisms configured to adjust the heading or direction of the vehicle 200. The brake system may be, for example, any combination of mechanisms configured to decelerate the vehicle 200 (e.g., friction braking system, regenerative braking system, etc.) The vehicle control module 206 may be configured to avoid obstacles in the environment surrounding the vehicle 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

Figure 3:
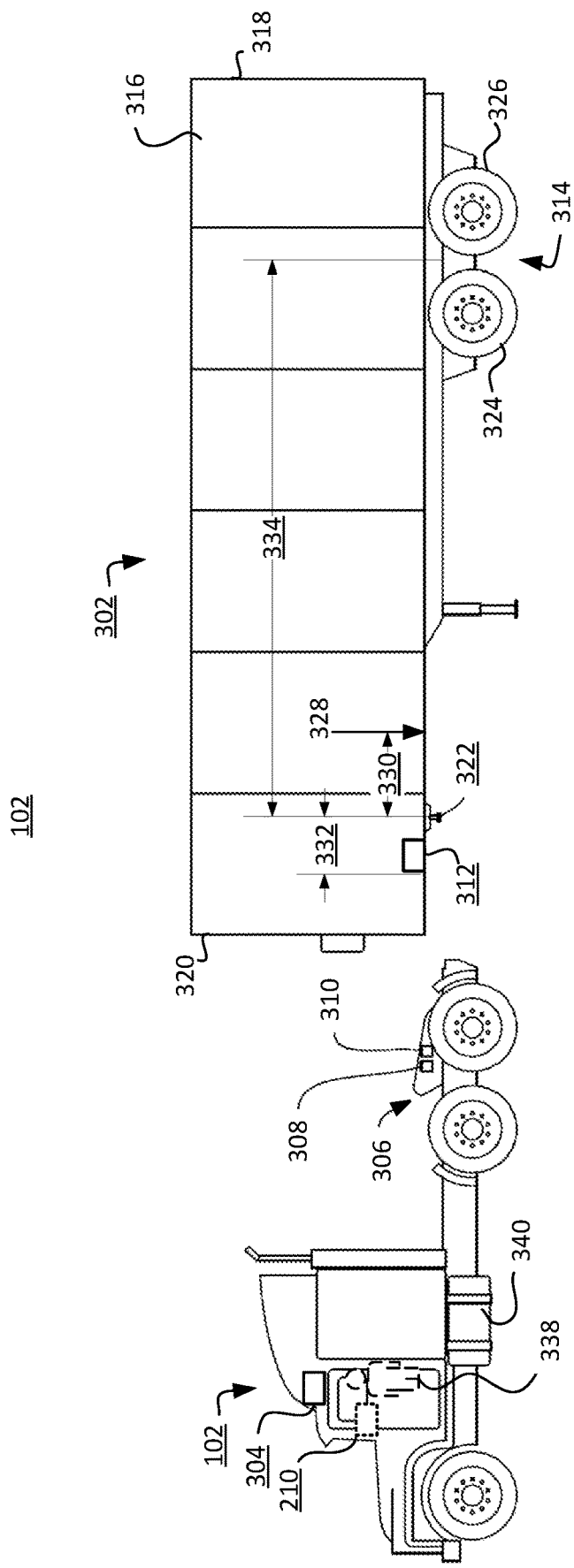
FIG. 3 is side view of a vehicle shown in relation to a trailer, according to an embodiment.

Referring now to FIG. 3, a side view of an autonomous vehicle 102 in relation to a trailer 302 is provided, according to an embodiment the present disclosure. In some embodiments, either of the autonomous vehicle 102 coupled to the trailer 302, or the uncoupled portion of the autonomous vehicle 102 may be referred to as the autonomous vehicle 102. The portion of the autonomous vehicle 102 shown separately from the trailer 302 may be referred to as the tractor, tractor portion of the autonomous vehicle 102, or the uncoupled portion of the autonomous vehicle 102.

The tractor can include a distance sensor 304 such as a radar or LiDAR sensor configured to monitor a perception area 118 along a left (as depicted) or right side of the autonomous vehicle 102. The distance sensor 304 can be coupled to a processor 210 of the autonomous vehicle 102, such as a processor 210 of or interfacing with an autonomy system 250. The distance sensor 304 can detect any of a side panel 316 or other lateral extreme of the autonomous vehicle 102, or a longitudinal extreme such as a rear longitudinal extreme 318 or front longitudinal extreme 320 of the trailer 302. For example, a portion of the trailer 302 can be in or out of a field of view based on a coupling angle between the tractor and the trailer 302. The coupling may be a rotatable coupler of a fifth wheel assembly 306.

The tractor, or another portion of the autonomous vehicle 102 can include one or more variable loads (also referred to as variable weights or masses). A variable load can include occupants 338, which may be sensed according to a manifest, mode of operation, pressure sensor, seatbelt sensor or other data available to a processor 210 of the autonomous vehicle. For example, the sensor can detect an indication of occupancy or a number of occupants 338, whereupon the processor 210 can estimate a weight based on an identity, demographic, or number of occupants 338 (e.g., an occupant 338 manifested to sleep overnight in a vehicle may be associated with a higher weight to account for traveling supplies, relative to a short haul occupant 338). A variable load can include fuel 340 or exhaust fluid, which may be sensed according to a fuel sensor, mode of operation (e.g., fuel flow rate of a combustible fuel over time or miles traveled), or other data available to a processor 210 of the autonomous vehicle 102. For example, the sensor can detect an indication of a percent of fuel 340 available, whereupon the processor 210 can estimate a weight based on a predefined fuel capacity and known fuel density. The processor 210 can update the variable load over time, such as to account for an updated fuel reading of a fuel sensor, number of miles traveled, or an indication of fuel use received from the vehicle control module 206.

The tractor can include a fifth wheel assembly 306 configured to receive a rotatable coupler such as a kingpin 322 of the trailer 302 (also referred to as a coupling unit). The processor 210 can store a location of the kingpin 322 (e.g., a throat 308 of the fifth wheel assembly 306 configured to receive the kingpin 322). For example, the kingpin location can be disposed at a predefined distance from one or more distance sensors 304 of the tractor. The predefined distance can include a longitudinal distance along a longitudinal centerline of the autonomous vehicle 102 (left to right, as depicted). The predefined distance can include a lateral distance from the centerline of the vehicle. For example, the distance sensors 304 can be coupled away from a center line of the vehicle, where the processor 210 can store a lateral offset from the centerline which may be employed to determine center line distances based on line of sight distances to the trailer wheels.

In some embodiments, proximal to the fifth wheel assembly 306, a transceiver 310 in network communication with one or more processors 210 is configured to interface with a corresponding device 312 of the trailer 302. Such a transceiver 310 can interface with or be a constituent portion of the transceiver 226 of FIG. 2. The device 312 can wirelessly communicate with the transceiver 310. For example, the device 312 can be or include a near field communication (NFC) or radio frequency identification (RFID) transceiver. The device 312 can communicatively couple to the transceiver 310. The device 312 can include a memory such as a read only memory or a writable memory such as a FLASH memory. The device 312 can be or include an adhesive element or other mechanical coupler (e.g., magnet, bolt, or so forth). The device 312 can be an active device 312 (e.g., include an energy source, such as a solar panel or connection to an autonomous vehicle power source). The device 312 can be a passive device 312 (e.g., receive power, wirelessly, from the transceiver 310 of the autonomous vehicle 102).

The device 312 can store, in the memory thereof, information associated with the trailer 302. For example, the information can include a model number, unique identifier for the trailer 302 or the device 312, a wheelbase 334 between the kingpin 322 and the wheel assembly 314, or a mass density function for the empty trailer 302. The wheelbase 334 (e.g., rear wheelbase 334) of the trailer can extend from the kingpin 322 to a midpoint of the front wheel assembly 324 and rear wheel assembly 326 of the wheel assembly 314. The memory can include an indication of a longitudinal center of mass 328 of a load, such as a rearward distance 330 from the kingpin 322, a forward distance 332 from the kingpin 322 or front or rear of the trailer 302, or another trailer portion. For example, the memory can store the indication based on information received from (e.g., computer by) the processor 210. The memory can include information related to a moment of inertia for either of the empty trailer 302 or a load thereof. The memory can include information associated with a nominal load mass (e.g., as measured at or reported by a hub), property (e.g., corrosivity or flammability) or the like.

As indicated, the various distances can be longitudinal distances along the trailer 302, such as along a centerline thereof (e.g., a centerline passing through the kingpin 322). In some embodiments, any of the memory information can be received from or stored by a shipper, trailer manufacturer, weight station scale, etc. In some embodiments, any of the memory information can be received from or stored by the transceiver 310 of the vehicle. For example, the transceiver 310 can store information associated with the trailer 302 determined by a processor 210 thereof (e.g., any of the information determined herein can be stored by the device 312). Such an example is not limiting. For example, in some embodiments, any of the information discussed herein can be received according to both a lateral and longitudinal dimension, which may increase, somewhat, a predictive power of a model of the autonomous vehicle 102, but may, in some embodiments, increase compute or memory resources used of the vehicle.

Figure 4:
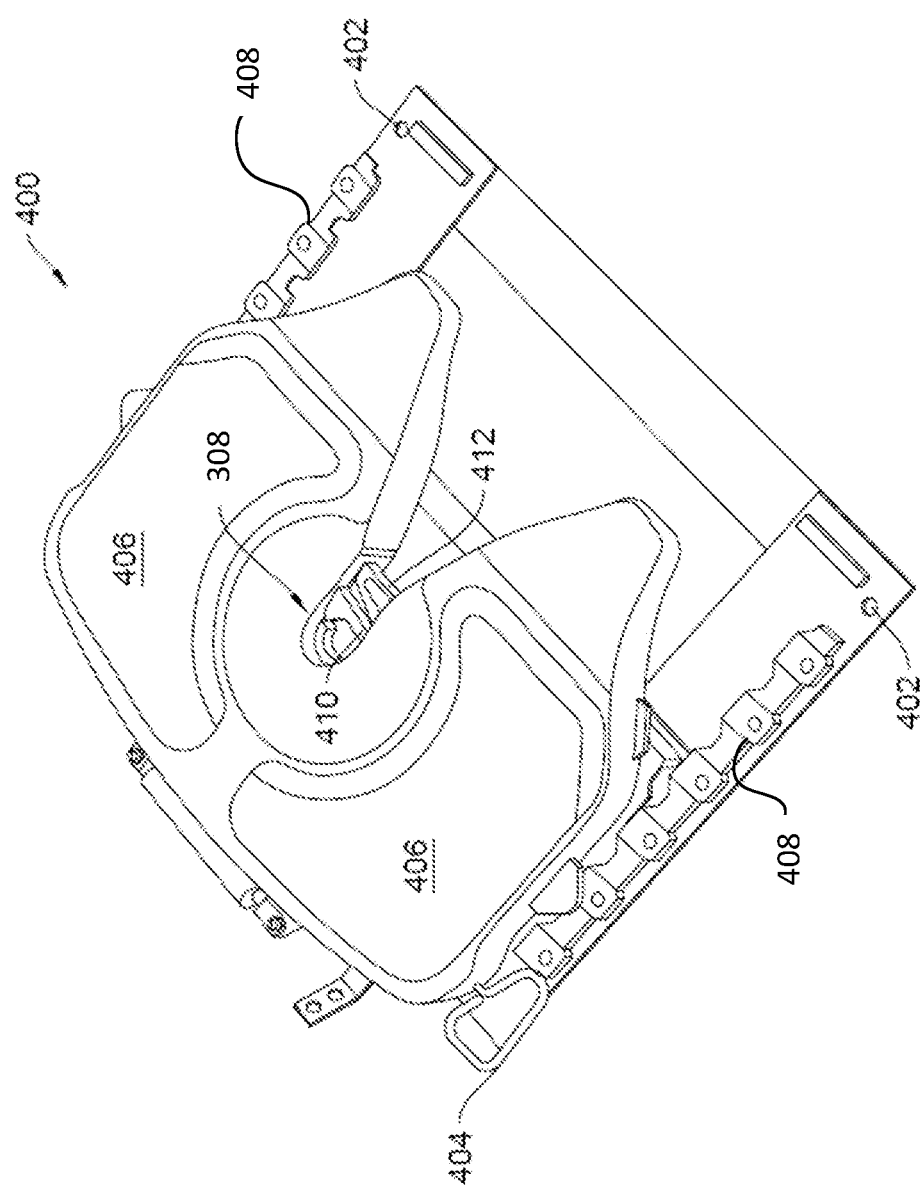
FIG. 4 is a fifth-wheel hitch of the fifth wheel assembly, according to an embodiment.

Turning now to FIG. 4, a fifth-wheel hitch 400 of the fifth wheel assembly 306 is shown. The fifth-wheel hitch 400 comprises at least one mounting point 402. The least one mounting point 402 is configured to accept a bolt or other mounting hardware to cooperatively couple the fifth-wheel hitch 400 to the vehicle. In an embodiment, the fifth-wheel hitch 400 is coupled to a tractor trailer. While a fifth-wheel hitch 400 is illustrated and described herein, it should be understood that the concepts and features of the present disclosure extend to any and all coupling receivers as described herein and elsewhere.

The fifth-wheel hitch 400 further includes top plates 406. Top plates 406 are configured so as to allow the trailer 302 to rest thereon. In some embodiments, top plates 406 include integrated grooves to allow for grease to be placed therein to provide lubrication between the trailer 302 and the top plates 406. This lubrication aids rotation of the trailer 302 with respect to the fifth-wheel hitch 400 during operation. In various embodiments, the fifth-wheel hitch 400 can include a weight sensor such as an air suspension displacement sensor, stress sensor, strain sensor, or other sensor employed to determine a weight applied thereto. In some embodiments, a sensor can detect a rotation of the coupling unit (e.g., the kingpin 322) within the throat 308 which may be indicative of a rotation of the trailer 302 with respect to a tractor.

The fifth-wheel hitch 400 includes a throat 308, into which the coupling unit (e.g., the kingpin 322) may engage. Locking jaw 412 and engaging jaw 410 may cooperatively engage to lock the kingpin 322 into the throat 308. In some embodiments, only one jaw 410, 412 is needed to lock the kingpin 322 into the throat 308. According to an embodiment, the jaws 410, 412 may be autonomously engaged to lock the kingpin 322 into the throat 308. The autonomy system 114 of FIG. 1 may contain instructions that allow for the autonomous locking of jaws 410, 412 into place. For example, upon the processor 210 receiving a signal that a sensor senses the presence of the coupling unit (e.g., the kingpin 322), the processor 210 may transmit a signal to the control system to engage the jaws 410, 412 of FIG. 4. Upon engaging them, another sensor may transmit a signal indicating that the jaws 410, 412 are fully engaged and locked into position. The processor 210 then transmits instructions to control system to allow the operation of the driveline.

The jaws may be actuated autonomously through the use of a hydraulic system on the autonomous vehicle 102. The hydraulic system may use cylinders and pistons to linearly actuate the jaws 410, 412 against each other to lock them into place. Alternatively, the jaws may be rotated into place using the autonomous vehicle 102 hydraulic system. In some embodiments, the jaws 410 may be actuated pneumatically (e.g., using the air compression system of vehicle 102), electromagnetically (e.g., using solenoids or relays), or electromechanically (e.g., using a motor, ball screw, lead screw, etc.).

The location of the fifth-wheel hitch 400 can be adjusted. For example, the fifth-wheel hitch 400 can be adjusted forward or rearward along a center line of the vehicle. A locking handle 404 can lock the fifth-wheel hitch 400 in place longitudinally along rails 410. In some embodiments, an air release or other mechanisms for the locking system can be operated from inside the cab, such as by the processor 210 (e.g., by the vehicle control module 206). For example, the vehicle control module 206 can drive the autonomous vehicle 102 slowly forward or backward until the fifth-wheel hitch 400 is in a selected position. A detection of the position of the wheelbase 334 distance between the kingpin 322 and the wheel assembly 314 (e.g., a midpoint thereof) can depend on a position of the fifth-wheel hitch 400. For example, one or more sensors can detect a position of the kingpin 322, and the systems and methods disclosed herein can determine the wheelbase 334 based thereupon.

Figure 5:
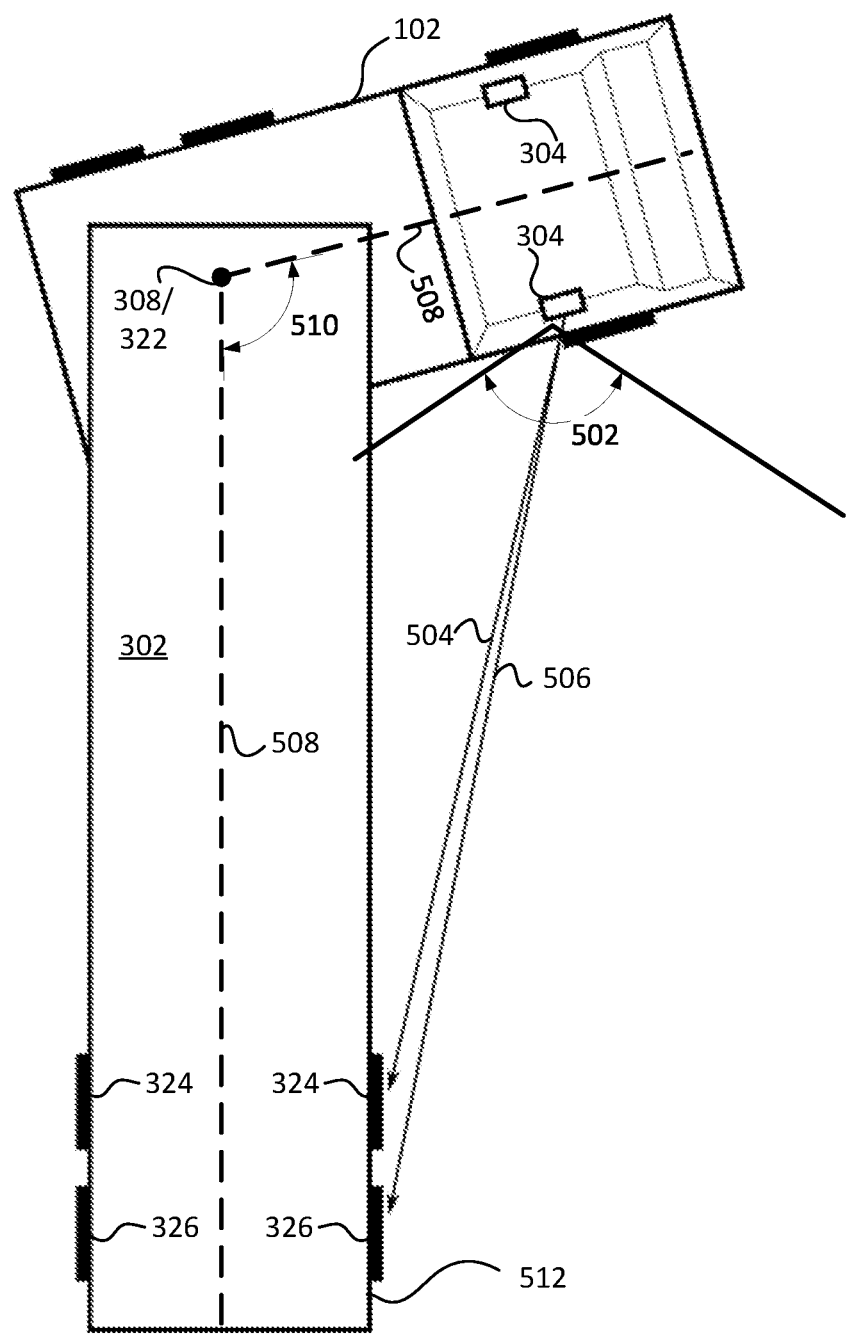
FIG. 5 is a top view of the vehicle, according to an embodiment.

FIG. 5 depicts a top view 500 of an autonomous vehicle 102, according to an embodiment of the present disclosure. The autonomous vehicle 102 includes a trailer 302 rotatably coupled to a tractor portion, such as by a kingpin 322 received into a throat 308 at the centerline 508 of the autonomous vehicle 102. The tractor portion and trailer 302 can pivot about the rotatable coupling such as when turning to traverse a route or back up to a loading dock. A coupling angle 510 can refer to a relative radial position between the tractor and the trailer 302. A FOV 502 of a distance sensor 304 can include various portions of the trailer 302. The lateral extremes of the FOV 502 may be associated with decreased detection accuracy or granularity, such that the processor 210 can employ time-averaging or smoothing to determine a position of an object. The processor 210 can filter or process information over time to increase confidence thereof, such as a confidence of a distance, speed, or dimension. In some implementations, the FOV 502 may be centered on or include a line of sight (LoS) extending perpendicular to the centerline of the autonomous vehicle 102. For example, the LoS can extend 90° frontward or backward therefrom, or 45° frontward or backward therefrom. In some embodiments, the FOV 502 may be biased somewhat forward or rearward of a LOS extending perpendicular to the centerline of the autonomous vehicle 102. A LOS is not intended to be limited to a human eye or vision system. That is, LoS may be based on the penetrating and reflective properties of the carrier wave of the sensor, which are not limited to visible waves of the electromagnetic (EM) spectrum. For example, sound waves and other regions of the EM spectrum can establish LoS, which may penetrate plastic, fog, or other materials opaque to some other carrier waves.

As depicted, the FOV 502 can include a first LoS 504 to a first wheel assembly 324 and a second LoS 506 to a second wheel assembly 326. The distance sensor 304, (e.g., in combination with a processor 210 communicatively coupled thereto) can discriminate between the wheel assemblies 324, 326 and other portions of the autonomous vehicle 102 or an environment 100 in the FOV 502 according to a location, shape, color, or other properties of the wheel assemblies 324, 326. In various embodiments, the distance sensor 304, or a processor 210 communicatively coupled thereto, can determine the wheel location at a halt, or while the autonomous vehicle 102 is in motion. For example, the distance sensor 304, or a processor 210 communicatively coupled thereto, can determine a wheel assembly 324, 326 is or is not associated with the autonomous vehicle 102 based on movement of the wheel assembly 324, 326 corresponding to movement of the trailer portion of the autonomous vehicle 102.

The autonomous vehicle 102 can determine a coupling angle 510 based on further LoS along the lateral extreme 512 of the trailer 302. For example, the autonomous vehicle 102 can determine a trailer angle based on distances to various locations disposed along the trailer panels. The coupling angle 510 can correspond to a trailer angle. For example, if the lateral extreme 512 is at 35° relative to the centerline of the tractor portion of the autonomous vehicle, the autonomous vehicle 102 can determine that the coupling angle 510 is about 35°.

Figure 6:
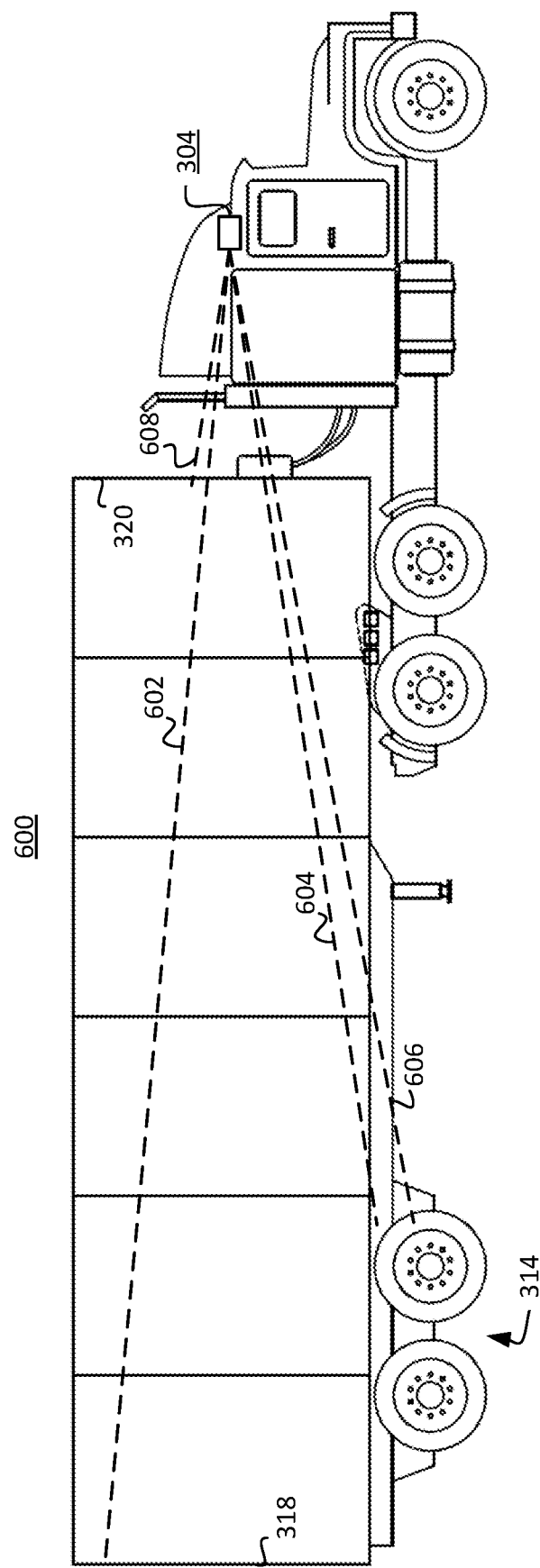
FIG. 6 is a side view of the vehicle, according to an embodiment.

FIG. 6 depicts a side view 600 of an autonomous vehicle 102, according to an embodiment of the present disclosure. The autonomous vehicle 102 includes a distance sensor 304 to detect a portion of the trailer 302. For example, the depicted autonomous vehicle 102 can be navigating a right turn, as depicted in FIG. 5, or the distance sensor 304 can have a FOV 502 exceeding 180° or can bias rearward.

The distance sensor 304 can determine a distance from the distance sensor 304 to the various portions of the trailer 302 along various LoS. The trailer 302 can correspond to one or more LoS. For example, a distance sensor 304 can detect the rear longitudinal extreme 318 of the trailer 302 along a first LoS 602. The detection of the rear longitudinal extreme 318 can vary according to a rotation of the rotatable coupler (e.g., kingpin 322). For example, as an angle of the rotation of the rotatable coupler increases in a rightward turn, a second LoS 604 can interface with a rotating wheel assembly 314; a third LoS 606 can interface with a portion of the trailer 302 proximal to the wheel assembly 314. As an angle of the rotation of the rotatable coupler further increases in a rightward turn, a fourth LoS 608 can interface with a front longitudinal extreme 320 of the trailer 302.

Any of the LoS 602, 604, 606, 608, can detect a distance to the respective portions of the trailer 302. The distance sensor 304 can determine a distance to the trailer 302 along the various LoS. The processor 210 can determine a trailer angle based on the various distances, employing, for example, triangulation. For example, the processor 210 can determine an angle of a panel of an enclosed trailer 302, a siderail of a flatbed trailer 302, or a trailer skirt. The angle can correspond to a coupling angle 510 between a tractor and trailer 302.

Along with the distances, the distance sensor 304 can detect a detection range rate (e.g., speed, relative to the distance sensor 304) of a trailer portion. For example, the panel or siderail can have a detection range rate of about zero (e.g., traveling with the tractor, or a near-zero speed indicative of trailer sway). The tires can have a non-zero detection range rate, as is further described with regard to FIG. 7. In some embodiments, the distance sensor 304 can determine a rate of sway based on time-series information (e.g., information indicating a rear longitudinal extreme 318 of the trailer 302 is moving towards and away from the sensor in an oscillatory fashion). In some embodiments such motion can be determined based on lines of sight from distance sensors 304 disposed on opposite lateral extremes 512 of the autonomous vehicle 102, such as where the rear of the trailer 302 enters and exits of FOV 502 of the depicted right side distance sensor 304, and enters and exits another FOV 502 of a left side distance sensor 304 (not depicted).

The various distances or detection range rates can be smoothed, averaged, or pruned of outliers. For example, errant or spurious detections, detections of passing vehicles, roadway signage, or the like can be pruned from sensed data based on the averaging, smoothing, and range rate filtering. For example, a vehicle can converge towards a determined distance of a wheel assembly 314 over a course of a trip. In some embodiments, a default distance can be employed prior to detection of the wheel assembly 314. In some embodiments, a range limit (e.g., less than five meters, or more than 20 meters) may be imposed on wheel assemblies 314, to avoid false detections. In some embodiments, a plurality of wheel assemblies 314 may be located, as in the case of multi-trailer autonomous vehicles 102. Indeed, the systems and methods disclosed herein may be employed to determine one or more centers of mass or moments of inertia, etc. for a multi-trailer system.

Figure 7:
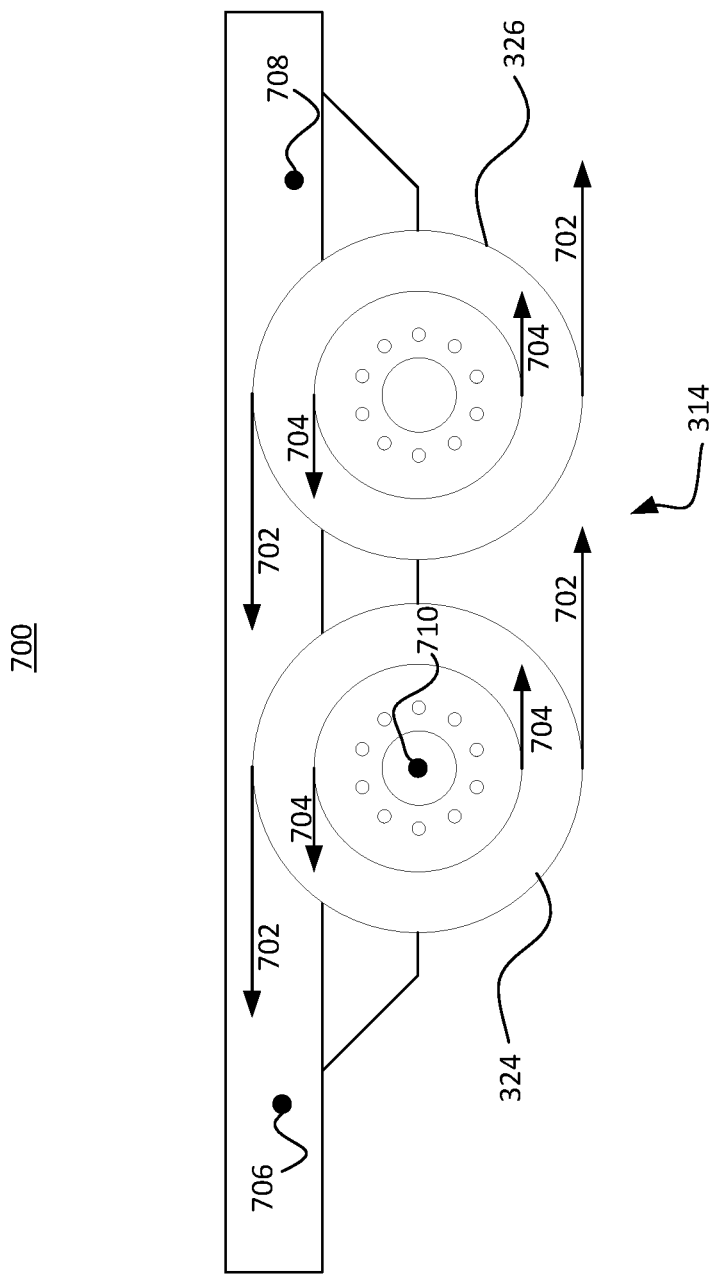
FIG. 7 is a side view of a wheel assembly undergoing motion, according to an embodiment.

FIG. 7 depicts LoS terminus points along a wheel assembly 314 and a proximal portion of the trailer 302. Detection range rate vectors are provided, relative to the distance sensor 304. For example, a first detection range rate vector 702 can correspond to a surface of the wheel assembly 314, matching a traveling speed of the vehicle. Further inward portions of the wheel assembly 314, such as the depicted second detection range rate vector 704 can be associated with a range rate vector of lesser magnitude. Further vectors, such as a third detection range rate vector 706 forward of and proximal to the wheel assembly 314 and a fourth detection range rate vector 708 rearward of and proximal to the wheel assembly 314 are provided. A local minimum vector 710 can correspond to the center point of the wheel assembly 314. The processor 210 can determine the location of the wheel assemblies 314 by a detection of non-zero detection range rate vectors indicative of motion relative to the proximal portion of the trailer 302, or a local minimum indicative of a center point of one or more wheels of the wheel assembly 314. For example, the processor can recursively detect detection range rates over a wheel to find the local minimum (e.g., center) having a minimum speed, relative to the distance sensor 304.

Figure 8:
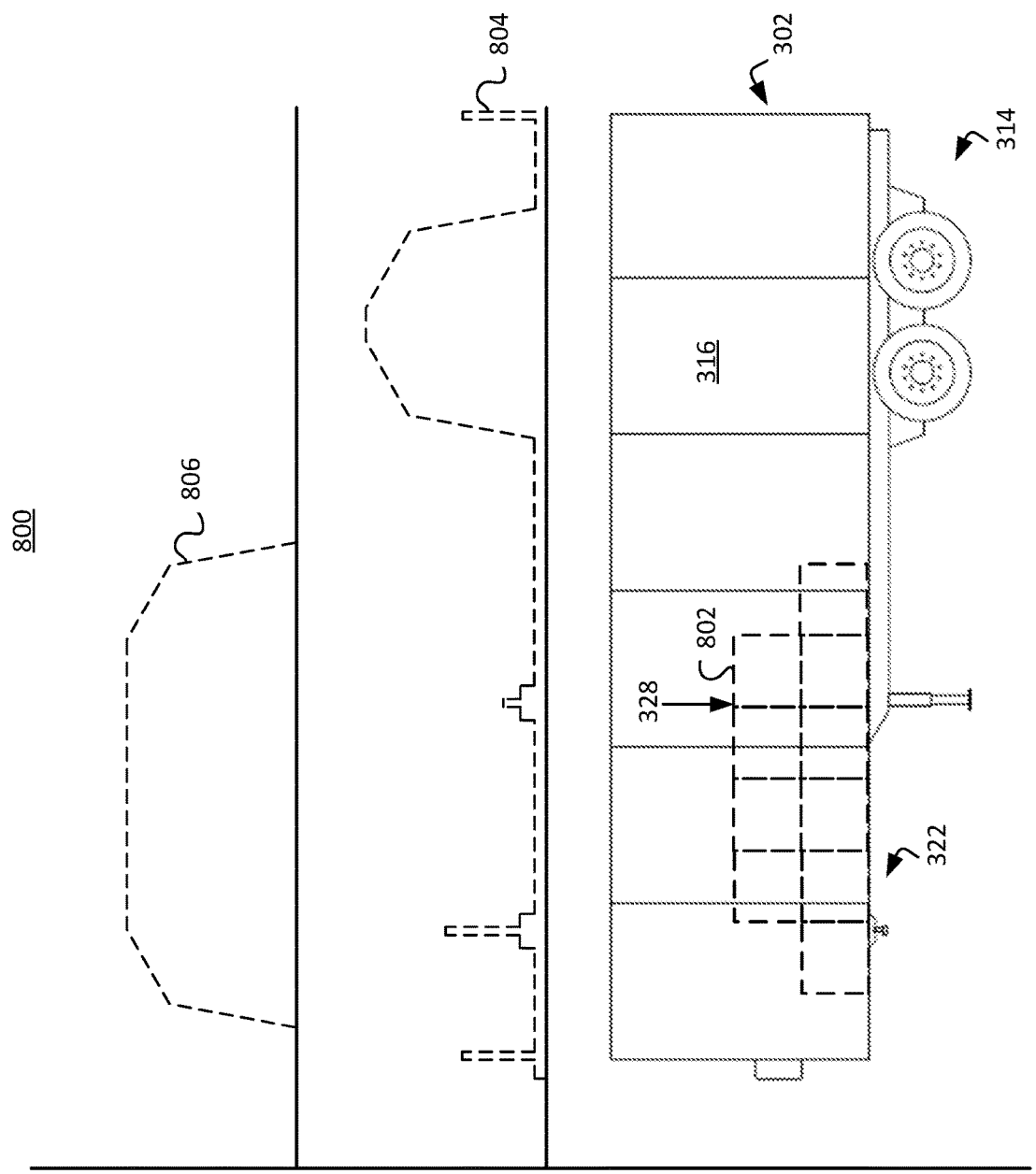
FIG. 8 is a mass density diagram for a trailer including a trailer mass density distribution and a load mass density distribution, according to an embodiment.

FIG. 8 is a mass density diagram 800 of a trailer 302. The mass density diagram 800 is disposed over a longitudinal dimension of the trailer 302, having a load 802 disposed therein. For example, a mass density can vary along a trailer 302, wherein a front and rear wall, kingpin 322, wheel assembly 324, or other portion of the trailer 302 may exhibit higher mass density relative to other portions of the trailer 302. The mass and mass distribution of the trailer 302 can vary according to a wheelbase, manufacturer, mass, model, climate control attachments, etc. For example, various trailers 302 can include flatbed trailers 302, tanker trailers 302, towed vehicles, refrigeration units, and the like. Likewise, the mass and mass distribution of the load 802 may vary according to a palletized, bulk, liquid, or other load 802.

The depicted trailer mass density distribution 804 can be received from a device 312 of the trailer 302, or via network communication responsive to a receipt of an identity of the trailer 302 (e.g., an identity received from the device 312). An integral of the trailer mass density distribution 804, the trailer mass, $m_{trailer}$, can likewise be stored or determined therefrom. In some embodiments, a trailer mass density distribution 804 can be determined based on a location of one or more wheels of a wheel assembly 314, or other trailer features such as the kingpin 322, panels 316, and the like. For example, mass distribution peaks corresponding to the front and rear of the trailer 302 may be included for an enclosed trailer 302 and omitted for a flatbed trailer 302. Thus, the processor 210 can generate an estimated trailer mass density distribution 804 based on detected features of the trailer 302. In some embodiments, the processor 210 can cause a transceiver 226 to store the generated estimated trailer mass density distribution 804 at the remote server 122, or cause the transceiver 310 to store the estimated trailer mass density distribution 804 on a memory of the device 312 of the trailer 302. In some embodiments, the trailer mass density distribution 804 can include less or more information. For example, the trailer mass density distribution 804 can include a lateral or vertical component, to identify the mass density in two or three dimensions which may be employed to generate a more granular or more predictive model of the trailer dynamics. Another trailer mass density distribution 804 can be a default, or generic distribution, which is employed prior to or upon a determination that another trailer mass density distribution 804 is unavailable (e.g., from a remote server 122 or a trailer device 312).

The depicted load mass density distribution 806 corresponds to a load 802 in the trailer 302. For example, the load mass density distribution 806 can include loading from the load 802 along with any tie-downs, or other interfaces between the load 802 and the trailer 302. The load mass density distribution 806 may not be received by the processor 210. For example, the processor 210 can determine an estimate of the load distribution, such as a portion of the load 802 transferred to various support points including the kingpin 322 or the wheel assembly 314. An aggregate mass density distribution can include a combination of the load 802 and the trailer 302, such as a summation of the trailer mass density distribution 804 and the load mass density distribution 806. Various aggregate mass density distributions can impose various moments on support points such as the kingpin 322 or the wheel assembly 314, which is relevant to vehicle handling.

Although not depicted, a further mass density distribution for a tractor portion of an autonomous vehicle 102 can further be stored, received, or processed by the processor 210. In some embodiments, the load mass density can include an indication of fuel 340, or occupants 338 for the distribution. For example, the mass density distribution can adjust a mass disposed at a fuel tank responsive to a sensed quantity of fuel 340 from a fuel sensor, or a mass disposed at a seating location responsive to a sensed occupancy of the autonomous vehicle 102.

The total mass of the trailer 302 can be defined from integrating aggregate mass density distribution from a front-most portion ($x_f$; also referred to as the front longitudinal extreme 320) to a rearmost portion ($x_r$; also referred to as the rear longitudinal extreme 318) of the aggregate mass density distribution as follows:

$$m = \int_{x_f}^{x_r} \rho(x)dx \qquad \text{Equation 1}$$

A mass of the loaded trailer 302, $m_{trailer}$ can be determined by subtracting a mass of a tractor, occupants 338, and other variable loads 802 associated with the trailer 302 (e.g., fuel 340, as determined by a fuel gage of the vehicle control module 206) from a total mass of a tractor-trailer, which can be measured, for example, by a CAN bus; a center of mass $x_C$ 328 of the trailer 302 describes a point at which the integral of the frontward and rearward mass density distributions are equal, which may be expressed, for a center of mass 328 between the kingpin 322 and the wheel assembly 314 as either of:

$$\int_{x_f}^{x_r} (x - x_c)\rho(x)dx = 0; \text{ or} \qquad \text{Equation 2}$$

$$X_c = \frac{1}{m} \int_{x_f}^{x_r} (x)\rho(x)dx \qquad \text{Equation 3}$$

A weight at a kingpin 322 can be measured at based on a strain gage of the fifth wheel hitch 400, or based on techniques described in, for example, SAE Technical Paper 2016-01-8031, 2016 entitled "Pneumatically Shifted Air Suspension Loading for Improved Fuel Economy Benefits," which is hereby incorporated by reference in its entirety. A corresponding mass is described as follows, where N is a normalization factor to normalize the mass on the kingpin 322 and the wheel assembly 314. $m_0$ refers to the effective mass on the kingpin, while $m_w$ refers to the effective mass on the wheel assembly 314. In some embodiments, various instances of $m_w$ may be determined, such as a separate $m_w$ for a support structure for each axle, or each wheel. Quantifications of $m_0$ and $m_w$ follow:

$$m_0 = N \int_{x_f}^{x_r} (x_w - x)\rho(x)dx \qquad \text{Equation 4}$$

$$m_w = m - m_w = N \int_{x_f}^{x_r} (x)\rho(x)dx \qquad \text{Equation 5}$$

Summing the above, $m_w$ and $m_0$ form a total mass follows:

$$m = m_0 + m_w = x_w N \int_{x_f}^{x_r} \rho(x)dx \qquad \text{Equation 6}$$

Thus:

$$N = \frac{1}{x_w}. \qquad \text{Equation 7}$$

Combining equations 4 and five provides $m_\theta$, $$m_0 = m\left(1 - \frac{x_c}{x_w}\right) \qquad \text{Equation 8}$$

Solving for $x_c$, $$x_c = x_w\left(1 - \frac{m_0}{m}\right) \qquad \text{Equation 9}$$

Trailer handling can depend on a moment of inertia of the trailer 302. For example, a trailer 302 having a load 802 concentrated about a center of mass 328 (e.g., a tungsten ingot) may handle differently from a distributed load 802 of soft drinks of the same mass. Thus, having determined mass associated with contact points, a moment of inertia, $I_0$, for the trailer 302 can be defined as:

$$I_0 = \int_{x_f}^{x_r} x^2 \rho(x)dx \qquad \text{Equation 10}$$

or, applying the parallel axis theorem, $$I_0 = mx_c^2 + \int_{x_f}^{x_r} (x - x_c)^2 \rho(x)dx \qquad \text{Equation 11}$$

The processor 210 can bound the moment of inertia between a minimum (e.g., a mass density centered locally on the center of mass); that is:

$$\min_{\rho(x)}(I_0) = mx_c^2 \qquad \text{Equation 12}$$

or a maximum (e.g., a mass density including half of a load at a smaller of $(x_c - x_f)$ or $(x_r - x_c)$. That is:

$$\max_{\rho(x)}(I_0) = m\left(x_c^2 + \min(\{x_c - x_f, x_r - x_c\})^2\right) \qquad \text{Equation 13}$$

Figure 9:
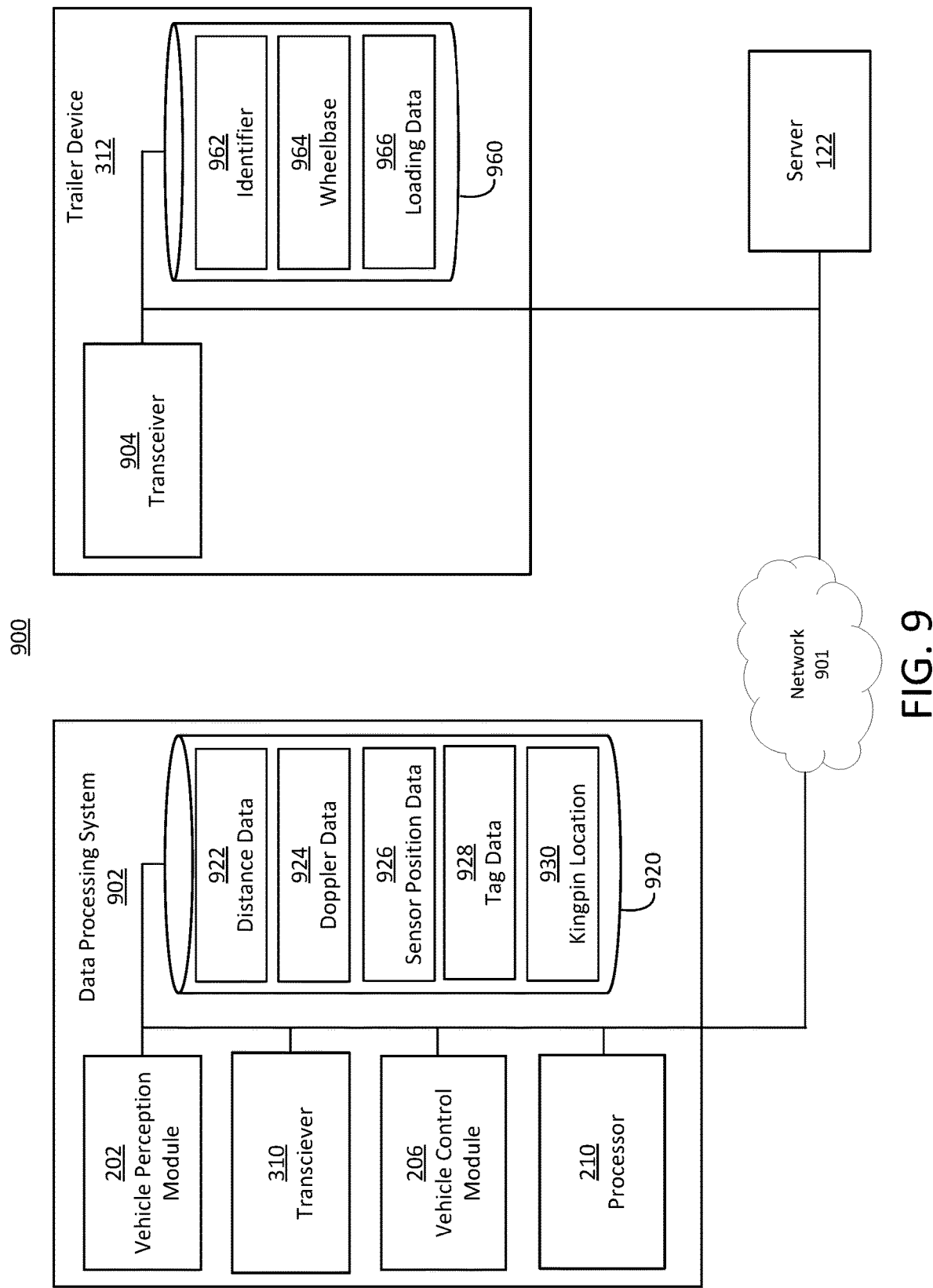
FIG. 9 is a block diagram of a data processing system of a vehicle, according to an embodiment.

FIG. 9 is a block diagram for a system 900 including a data processing system 902 for a vehicle, shown interfacing with a trailer device 312. In various embodiments, the data processing system 902 may be integral to or interface with various vehicles such as autonomous vehicles 102. For example, the data processing system 902 can include or interface with components disposed on a tractor of the autonomous vehicle 102, a trailer 302 of the autonomous vehicle 102, or remote therefrom, in network communication with further elements proximal to the autonomous vehicle 102. In some embodiments, the trailer device 312 may be omitted or modified. For example, the trailer 302 can include an identifier 962 such as a road number, license plate number, a trailer identification number (TIN), or other unique or non-unique identifier 962. The identifier 962 can be received by the data processing system 902, from the trailer device 312, omitted, or otherwise received such as via manual entry via a user interface, from a vision system of the vehicle detecting a quick response (QR) code, text string, or trailer shape detection, or so forth). In some embodiments, the trailer 302 or attributes thereof (e.g., wheelbase 334 or sway) are identified from a distance sensor 304 of the data processing system 902.

The data processing system 902 can include or otherwise interface with at least one vehicle perception module 202, transceiver 310, vehicle control module 206, or processor 210, each of which may each include or interface with at least one processing unit or other logic device such as a programmable logic array engine, or module configured to communicate with the data repository 920 or database (e.g., instances of the processor 210). The vehicle perception module 202, transceiver 310, vehicle control module 206, or processor 210 can be separate components, a single component, or part of the autonomous vehicle 102. The data processing system 902 can include hardware elements, such as one or more processors, logic devices, or circuits. For example, the data processing system 902 can include one or more components or structures of functionality of computing devices depicted in FIG. 1 or FIG. 2 such as the remote server 122, 270. The various components of the data processing system 902 can be in network communication via a controller area network (CAN), Ethernet, or any number of other wired or wireless networks 901. For example, the data processing system 902 can include elements disposed proximal to the autonomous vehicle 102 and further elements disposed remote therefrom. The network 901 can include NFC or RFID communication with a passive or active device 312 coupled to the trailer 302. For example, a transceiver 310 of the data processing system 902 can interface with a corresponding transceiver of an NFC or RFID device 312 coupled to the trailer 302, while another transceiver 226 can interface with a remote server 122, 270.

The data repository 920 can include one or more local or distributed databases, and can include a database management system. The data repository 920 can include computer data storage or memory and can store one or more data structures, such as distance data 922, doppler data 924, sensor position data 926, tag data 928, and kingpin location 930. The data repository 920 can further include various threshold, such as any predetermined or other threshold as is referenced herein, or which may be employed in combination with the systems and methods described herein.

Distance data 922 may refer to or include an indication of an imaging sensor such as a radar or LiDAR sensor, which can include an indication of the position of a portion of the trailer 302 such as a rear longitudinal extreme 318, front longitudinal extreme 320, or one or more wheel assemblies 314. The distance data 922 may include edges for one or more surfaces of the trailer 302, such as an outline of a wheel assembly 314 (e.g., according to an edge detection algorithm employed by the processor 210), or a portion of the trailer offset therefrom. The distance data 922 may include indications of a longitudinal, two-dimensional, or three-dimensional distances to various portions of the trailer 302, or a surrounding environment 100 including further vehicles 104. The data processing system 902 can disaggregate other vehicles 104 from the trailer 302 according to time series data (e.g., other vehicles 104 may be non-persistent), or according to range rate information indicating movement of various vehicle portions. For example, range rate information may be determined according to time series data or doppler data 924 indicating a contraction or expansion of a periodic frequency of a radar, LiDAR, or other distance sensor 304. The doppler data 924 may refer to or include range rate speeds returned for a radar system which may indicate a speed of trailer portions such as panels 316, siderails, and wheels. As indicated above, some portions such as wheels can indicate a speed from which the data processing system 902 can determine a center point of a wheel assembly 314.

Sensor position data 926 may refer to or include a predefined position for one or more sensors of an autonomous vehicle 102. For example, the one or more sensors can include side facing sensors disposed along lateral extremes 512 of an autonomous vehicle 102. The sensor position data 926 may include a longitudinal position along the centerline 508 (e.g., a distance from a kingpin 322). The sensor position data 926 may include a lateral distance from a centerline 508 of the autonomous vehicle 102, such as a distance of a rear view mirror of other lateral extreme 512 of the autonomous vehicle 102, or another mounting position of the sensor.

Tag data 928 may refer to or include information received from or provided to a trailer device 312. For example, the tag data 928 can be retrieved from a read only, non-transitive, or transitive memory device 960 of the trailer device 312. Non-limiting examples of tag data 928 include a vehicle identifier 962, wheelbase 964, or loading data 966. The vehicle identifier 962 may refer to or include a model number, length, class, type (e.g., liquid, refrigerated, enclosed, flatbed), weight, other information associated with the trailer 302. In some embodiments, the identifier 962 may be a unique identifier 962 such as a TIN. The server 122 can store information associated with a trailer identity, such that trailer information may be retrieved, by the data processing system 902, based on a provision of the tag data 928 to the server 122. For example, the tag data 928 can include an unloaded weight, model number, TIN, or maximum gross weight of a trailer 302. Upon receipt of the tag data 928, the data processing system 902 can convey at least a portion thereof (e.g., the TIN or model number), and retrieve further information, such as a three dimensional model including moment of inertia data, from the server 122.

The wheelbase 964 may refer to or include a distance from one or more wheel assemblies 314 to the kingpin 322, or another point of support of the trailer 302. In some embodiments, the wheelbase 964 may include a number of wheel assemblies 314 or wheels, distance therebetween, or supporting characteristics thereof (e.g., an indication that separate wheel assemblies 314 share a support structure or include separate support structures). In some embodiments, the wheelbase 964 can include a lateral dimension between wheels, such as a track width. In some embodiments, the wheelbase 964 can include an indication of a location of dolly wheels, spare wheels, or other objects disposed along the trailer 302 which may be detected, by an edge detection or shape recognition system, as a wheel assembly 314. The vehicle perception module 202 can thus discriminate between wheel assemblies 314 and other shapes along a trailer body.

The loading data 966 may refer to or include an indication of a weight, position, distribution, or other information associated with a load 802. The loading data 966 can include a property (e.g., corrosivity, flammability, or the like). The loading data 966 can be received from a loader, or generated by a processor 210. For example, the processor 210 can store a moment of inertia, load distribution, or other information which is generated thereby.

Kingpin locations 930 may refer to or include references to a location of a kingpin 322, or a receiving unit configured to receive the kingpin 322. For example, the kingpin location 930 can include an indication of a presence of a kingpin 322, or an angle or rotation. The kingpin location 930 can include a location of the kingpin 322 relative to one or more portions of the vehicle perception module 202 (e.g., distance sensors 304). The processor 210 can determine a location of a detected wheel assembly 314 relative to a kingpin 322 (e.g., along a centerline 508 of an autonomous vehicle 102.

The data processing system 902 can include, interface with, or otherwise employ a vehicle perception module 202. For example, the vehicle perception module 202 can include imaging sensors including distance sensors 304 configured to detect a position of a wheel assembly 314, according to an outline of the wheel assembly 314, the motion of the wheels of the wheel assembly 314, or doppler data 924 indicative of a speed of a portion of the trailer 302. For example, the distance sensors 304 can determine a lateral speed or other indication of motion of a trailer 302 to determine a sway of the trailer 302 (e.g., an oscillatory motion). In some embodiments, the vehicle perception module 202 can include a distance sensor 304 on each lateral surface of a tractor, such that the sensors can alternatively detect the trailer 302 and record an indication thereof including an indication of a time, and the vehicle perception module 202 can determine, based on a the indication of time and the detection of the trailer 302, a rate, or magnitude (e.g., angle) of sway. In some embodiments, the processor 210 can determine a distribution of mass based on the sway, or may otherwise determine that the frequency or magnitude of the sway exceeds a predetermined magnitude threshold such that an autonomy system 114 of the autonomous vehicle 102 can perform a navigational action.

The data processing system 902 can include, interface with, or otherwise employ a transceiver 310 to interface with a trailer device 312. The transceiver 310 can transfer a signal to a corresponding transceiver 904 of the trailer device 312 such as a wake signal, or a signal including energy to power the trailer device 312. The transceiver 310 can thereafter receive information from the memory 960 thereof (via the transceiver 904), or convey information to store upon the memory 960 (via the transceiver 904).

The data processing system 902 can include, interface with, or otherwise employ a vehicle control module 206 to perform a navigational action. In some embodiments, the vehicle control module 206 can include or interface with an autonomy system 114. In some embodiments, the vehicle control module 206 can execute a navigational action including a change to speed or direction. For example, the change to speed can include an imposition of a speed restriction, such that the vehicle does not travel at a speed greater than the speed restriction. The speed restriction may be a greater or lesser value than a current vehicle speed. In some embodiments, the navigational action can include a change in direction. The change in direction can include a change within a lane, between lanes (or shoulders of a road), or a change in direction between different pathways. For example, the change in direction can be a route which is determined in view of a speed restriction, or to route the vehicle to a loading dock to reconfigure a load 802 of the trailer 302.

The data processing system 902 can include, interface with, or otherwise employ one or more processors 210, as described with regard to FIG. 2. For example, the processor 210 can execute instructions to perform, schedule, or otherwise implement the various operations described herein as performed by the autonomous vehicle 102, tractor, various modules or systems thereof, or the like. The processor 210 can include any number of constituent processors 210, such as different processors 210 for different subsystems, or a processor 210 to manage a flow of information of otherwise coordinate between the various subsystems. Further, references to the data processing system 902 can be performed by a processor 210 thereof, such as by a single processor 210, multiple processors 210, each of which may execute one or more functions with regard to one or more of the systems, modules, or other elements described herein. For example, some determinations which are described as determined by a sensor can be determined by a processor 210 upon receipt of sensor data, determined by a local processor 210 of the sensor and thereafter conveyed to another processor 210 of the data processing system 902, or determined by any number of processors 210 in network communication with each other.

FIG. 10 is a flow diagram of an example method 1000 of determining a wheelbase 334 of a trailer 302 of an autonomous vehicle 102, according to an embodiment. The method may be performed by one or more devices or elements of FIG. 1, 2, 3, 5, 6, 7, 8, or 9 such as an autonomous vehicle 102 or another data processing system 902, including one or more processors 210. It is noted that the method 1000 is merely an example, and is not intended to limit the present disclosure. Accordingly, it is understood that additional operations may be provided before, during, and after the method 1000 of FIG. 10, and that some other operations may only be briefly described herein.

The method 1000 includes operation 1002, of receiving, from a distance sensor, data indicative of a first wheel assembly 314 in a FOV 502 of the distance sensor. The method 1000 includes operation 1004, of determining a distance to a portion of the trailer from the data. The method 1000 includes operation 1006, of determining a doppler shift indicative of a speed of a wheel of the first wheel assembly from the data. The method 1000 includes operation 1008, of determining, based on the distance and the doppler shift, a wheelbase 334 of the trailer 302.

Referring again to operation 1002, the method 1000 includes receiving, from a distance sensor, data indicative of a first wheel assembly 314 in a FOV 502 of the distance sensor. The data can include an edge of the trailer 302 enclosing the wheel assemblies 314, or features of the wheels, tires, or opening therefor. For example, the data can include two circular features corresponding to the wheels of the wheel assemblies 314, which are located within a predefined distance (e.g., between about forty inches to about sixty inches). In some embodiments, the data can include an opening of a trailer skirt, one or more features (e.g., lug nuts, valve stems, or the like) of the wheel assemblies 314, such that the data processing system 902 can identify a bound, edge, center, or other portion of the wheel assembly 314. In some embodiments, the data can include an indication of more than one wheel of the wheel assembly 314, such as a front wheel assembly 324 and rear wheel assembly 326 of a tandem wheel assembly 314. In some embodiments, the wheel assembly 314 can be located based on doppler data 924 such as a doppler shift indicative of a speed of the wheel of the wheel assembly 314, relative to the trailer 302.

Referring again to operation 1004, the method 1000 includes determining a distance to a portion of the trailer 302 from the data. For example, the portion of the trailer 302 can be or include a wheel assembly 314 thereof, a siderail, or a rear longitudinal extreme 318. The distance can be a distance from an imaging sensor such as a distance sensor 304 to the trailer portion. In some embodiments, the portion of the trailer 302 can include a flat surface of a panel 316, siderail, or other portion, such that the angle of the trailer 302 with respect the tractor can be determined (e.g., according to an indication of sensor position (e.g., angle or orientation) of the sensor position data 926) relative to the tractor.

Referring again to operation 1006, the method 1000 includes determining a doppler shift indicative of a speed of a wheel of the first wheel assembly 314 from the data. For example, the doppler shift may be indicated by the doppler data 924 received at operation 1002. The doppler data 924 may be employed to determine a center position of a wheel assembly 314. For example, in a longitudinal dimensions, the data processing system 902 can determine a wheel position based on the doppler data 924. In further embodiments, the center position of a wheel assembly 314 may be indicative of a distance from a roadway, according to a tire inflation. The center position of a wheel assembly 314 can be indicative of a trailer type. For example, upon determining a center-center distance between various wheels of the wheel assembly 314, the data processing system 902 can determine a trailer type based thereupon.

The doppler data 924 may be employed to discriminate between the trailer 302 and other vehicles 104 on the roadway. For example, the identification of the wheel assembly 314 having a speed which is similar to (e.g., within a threshold of, such as 10%, 5%, or 1%) the tractor speed for a predetermined time or distance may be indicative of a portion of the trailer 302 rather than another vehicle 104 along the roadway. For example, the data processing system 902 can employ time-series data (e.g., a filtered, averaged, smoothed, or other representation thereof) to determine a persistence or non-persistence of an object in combination with the doppler data 924. Moreover, the determination of a minimum speed at a center of the wheel assembly 314 can increase a detection accuracy or specificity. For example, the detection of a center portion of the wheel may increase an accuracy relative to any detection of the wheel, and may obviate visual limitations such as distortion of fisheye lenses, or operation during heavy fog, as may be present in other methods including those disclosed herein.

Referring again to operation 1008, the method 1000 includes determining, based on the distance and the doppler shift, a wheelbase 334 of the trailer 302. For example, the wheelbase 334 can extend from the kingpin 322 of the trailer 302 to a portion of the trailer 302 (e.g., front edge, center, time-average, or other representation of the wheel assembly 314). The wheelbase 334 may be determined, for example, based on a known position between the sensor and the kingpin 322, and the detected distance between the sensor and the wheel assembly 314. For example, via triangulation based on a known angle to the kingpin 322, a known distance to the kingpin 322, and a detected distance to the trailer 302. In some embodiments, the data processing system 902 may further employ a relative angle of the trailer 302 such as based on an angle between multiple wheels of a wheel assembly 314 or a substantially longitudinal portion of the trailer 302 such as the panels 316 or siderails thereof.

FIG. 11 is a flow diagram of another example method 1100 of determining a wheelbase 334 of a trailer 302 of an autonomous vehicle 102, according to an embodiment. The method may be performed by one or more devices or elements of FIG. 1, 2, 3, 5, 6, 7, 8, or 9 such as an autonomous vehicle 102 or another data processing system 902, including one or more processors 210. It is noted that the method 1100 is merely an example, and is not intended to limit the present disclosure. Accordingly, it is understood that additional operations may be provided before, during, and after the method 1100 of FIG. 11, and that some other operations may only be briefly described herein.

The method 1100 includes operation 1102, of receiving a mass distribution for a vehicle, including a mass of a tractor, trailer 302, and load 802. The method 1100 includes operation 1104, of receiving a geometry of a plurality of points of support disposed along a longitudinal axis of the trailer 302. The method 1100 includes operation 1106, of determining a center of mass 328 of the trailer 302 based on the plurality of points of support. The method 1100 includes operation 1108, of determining, based on the geometry of the plurality of points of support and the center of mass, a moment of inertia of the trailer 302 about at least one of the plurality of points of support. The method 1100 includes operation 1110, of performing a navigational action based on the moment of inertia.

Referring again to operation 1102, the method 1100 includes receiving a mass of a vehicle, including a mass of a tractor, trailer 302, and load 802. For example, the mass distribution can include a total mass, along with moments about various points disposed along a longitudinal centerline of the vehicle (e.g., supports or other portions of a wheel assembly 314), which may be representative of a mass density function describing the load mass density in one or more dimensions (e.g., a longitudinal, lateral, or height dimension). In some embodiments, a mass density function describing an empty trailer 302, and tractor may be received, such as including or excluding an indication of an occupant 338, fuel 340, or other variable portion thereof. For example, the mass for the load 802 can be received as an indication of total vehicle mass, and a force applied to a fifth-wheel hitch 400. In some embodiments, various mass values may be received separately, for example, the mass distribution for the empty trailer 302 may be received as a static value based on the trailer 302; the total mass may be received or updated based on vehicle operation (e.g., fuel use, occupancy, or so forth).

Referring again to operation 1104, the method 1100 includes receiving a geometry of a plurality of points of support disposed along a longitudinal axis of the trailer 302. The plurality of support points can include one or more wheels of a wheel assembly 314. In some embodiments, with specific regard to both operation 1104, and the various further embodiments disclosed herein, the wheels or other vehicle features can be abstracted to one or more points along a longitudinal line (or a vertical line, as in the case of various two-dimensional systems). The geometry of the points of support can refer to a longitudinal distance from the kingpin 322 or other coupling unit. In some embodiments, such as two- or three-dimensional embodiments, the distance can include a lateral or height distance (e.g., based on a determined tire pressure based on a local minimum speed, as discussed above). The geometry (e.g., longitudinal distance) can be received according to the various embodiments described herein, such as from a trailer device 312 via a wireless transceiver 904, QR code, detected trailer type, determined distance, or so forth.

Referring again to operation 1106, the method 1100 includes determining a center of mass 328 of the trailer 302 based on the plurality of points of support and effective mass the such points of support. For example, the data processing system 902 can determine the center of mass 328 based on the known and detected weights described with respect to operation 1102, as is further described with regard to FIG. 8. For example, the mass forward or rearward of a point of support may cause a moment about that point of support. Based on a detected wight of the trailer proximal the kingpin 322 and a total vehicle wight, the data processing system 902 can determine, estimate, observe, measure, etc. a center of mass 328.

Referring again to operation 1108, the method 1100 includes determining, based on the geometry of the plurality of points of support and the center of mass, a moment of inertia of the trailer 302 about at least one of the plurality of points of support. For example, the data processing system 902 can iterate Equation 11 to estimate a moment of inertia based on the mass and location of the center of mass, and a prediction of a mass density function based on the center of mass, as is further described with regard to FIG. 8. In some embodiments, the data processing system 902 can estimate the moment of inertia based on an observed rotation or sway of the trailer 302. For example, the data processing system 902 can determine an amount of rotation associated with a first moment of inertia, observe a magnitude of rotation greater than predicted for the moment of inertia, adjust the predicted moment of inertia, compare the adjust prediction to the amount of rotation observed, and so forth.

Referring again to operation 1110, the method 1100 includes performing a navigational action based on the moment of inertia. For example, the data processing system 902 can compare the moment of inertia to a threshold, and determine that the moment of inertia exceeds the threshold. The navigational action can include various actions which change a speed or a direction of travel of the autonomous vehicle 102. As described above, in some instances, a determination of an exceedance of a threshold may be determined prior to reaching a speed restriction, such that the change in speed may be relative to a speed the vehicle would otherwise travel as opposed to, for example, a reduction in speed relative to a current speed. In some embodiments, the change in speed or direction may be a speed reduction from a current speed based on an observed trailer sway or other rotation, or the estimation of the moment of inertia.

In some embodiments, the navigational action may be an adjustment to operation of an autonomous vehicle 102 to execute a predetermined average vehicle speed or direction. For example, the center of mass or center or moment of inertia (e.g., upper and lower bounds of the moment of inertia, or a center point thereof) can be conveyed to the vehicle control module 206 or another component of the vehicle control system, whereupon the vehicle control module 206 or other component of the vehicle control system can base navigational actions (e.g., a ramp rate of acceleration, an application of brake pressure at one or more wheels, operation of a differential, which may cause an adjustment of power applied to various wheels) on the received information. In some embodiments, an average speed of the autonomous vehicle 102 may be similar to unequipped vehicles, however, a lateral trailer speed or direction may differ (e.g., trailer sway may be inhibited). In some embodiments, the average vehicle speed or direction of travel may be adjusted by the systems and methods described herein.

The references to the execution of the navigational action (and other operations based on other criterion) described herein are not intended to be limiting. For example, at operation 1110, the navigational action may be further based on the center of mass, or other information available to the vehicle (e.g., speed limits, other vehicles, obstacles, and so forth).

Figure 12:
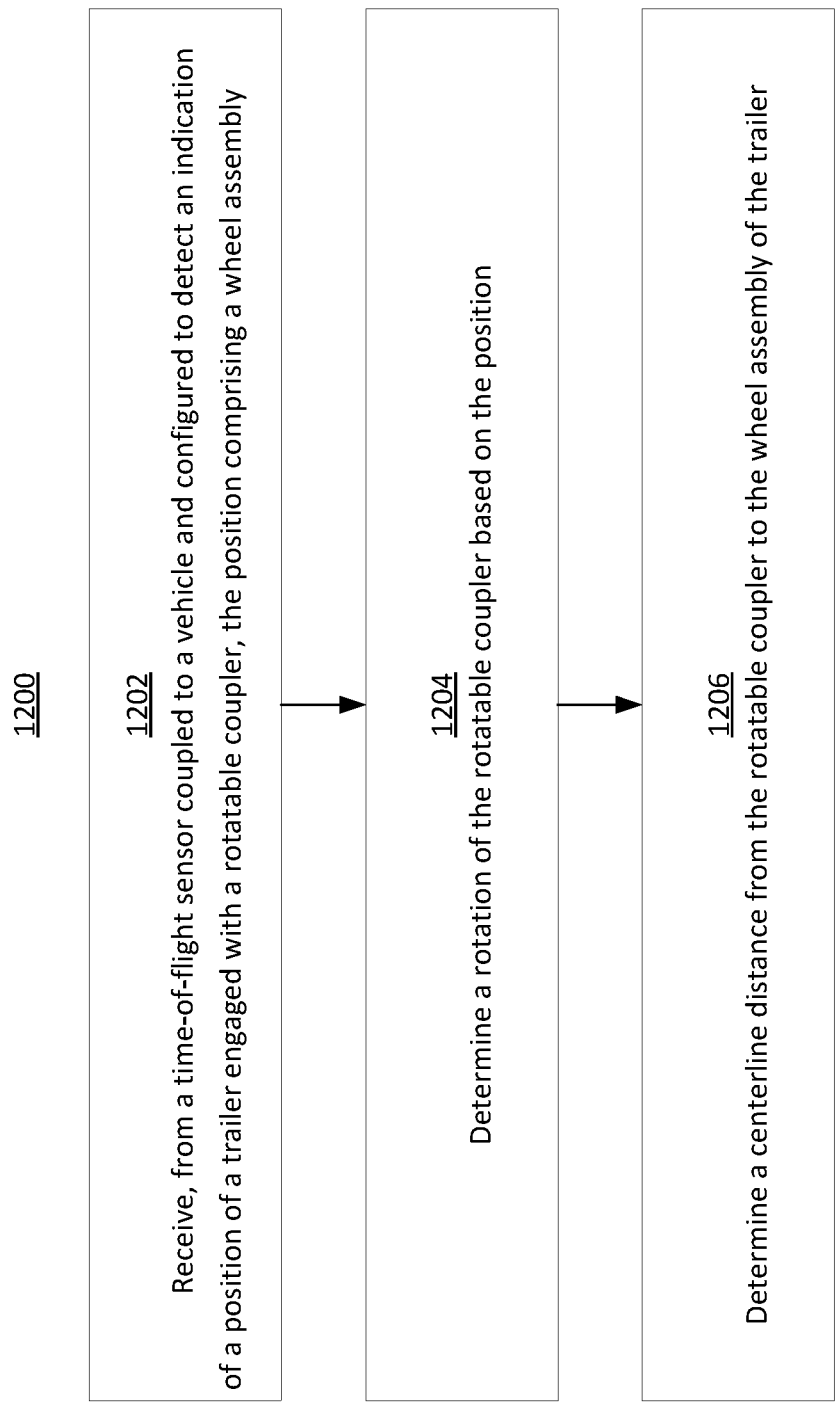
FIG. 12 is a flow diagram of another example method of trailer wheelbase determination, according to an embodiment.

FIG. 12 is a flow diagram of another example method 1200 of determining a wheelbase 334 of a trailer 302 of an autonomous vehicle 102, according to an embodiment. The method may be performed by one or more devices or elements of FIG. 1, 2, 3, 5, 6, 7, 8, or 9 such as an autonomous vehicle 102 or another data processing system 902, including one or more processors 210. It is noted that the method 1200 is merely an example, and is not intended to limit the present disclosure. Accordingly, it is understood that additional operations may be provided before, during, and after the method 1200 of FIG. 12, and that some other operations may only be briefly described herein.

The method 1200 includes operation 1202, of receiving, from a distance sensor coupled to a vehicle and configured to detect an indication of a position of a trailer 302 engaged with a rotatable coupler, the position comprising a wheel assembly 314. The method 1200 includes operation 1204, of determining a rotation of the rotatable coupler based on the position. The method 1200 includes operation 1206, of determining a centerline distance from the rotatable coupler to the wheel assembly 314 of the trailer 302.

Referring again to operation 1202, the method 1200 includes receiving, from a distance sensor 304 coupled to a vehicle and configured to detect an indication of a position of a trailer 302 engaged with a rotatable coupler, the position comprising a wheel assembly 314. For example, the position can include any number of wheels of the wheel assembly 314, edges of the trailer 302 proximal to the wheel assembly 314, and so forth. The position can include lateral portions of a panel 316 of an enclosed trailer 302, a siderail of the trailer 302, or so forth. For example, the position can include data indicative of a distance to the wheel assembly 314, and an angle of a portion of the autonomous vehicle 102 corresponding to an angle of a centerline 508 of the trailer 302 (e.g., a panel 316 or siderail which is parallel to, or substantially parallel to the centerline 508).

Referring again to operation 1204, the method 1200 includes determining a rotation of the rotatable coupler based on the position of the trailer engaged with the rotatable coupler. For example, the data processing system 902 can determine an angle based on a position of trailer 302, a sensor of a coupling angle of a coupling unit (e.g., kingpin 322) with a receiver therefor, or the like. In some embodiments, the rotation can be determined based on a distance between a first and second wheel of a wheel assembly 314. In some embodiments, the data processing system 902 can receive an indication of a vehicle speed, direction of travel (e.g., forward or reverse), steering direction or steering angle from the vehicle control module 206. The data processing system 902 can determine the rotation or distance based on the steering angle of the vehicle, such as by determining a difference, a progression over time, or the like.

Referring again to operation 1206, the method 1200 includes determining a centerline distance from the rotatable coupler to the wheel assembly 314 of the trailer 302. For example, the data processing system 902 can compare the distance and angle from the sensor to the wheels assembly with a known distance or angle between a receiver for a kingpin 322 or other coupling unit to the sensor to triangulate the position. The centerline distance can be determined based on the wheel assembly 314 extending perpendicular to a lateral surface of the trailer 302.

FIG. 13 is a flow diagram of another example method 1300 of determining a wheelbase 334 of a trailer 302 of an autonomous vehicle 102, according to an embodiment. The method 1300 may be performed by one or more devices or elements of FIG. 1, 2, 3, 5, 6, 7, 8, or 9 such as an autonomous vehicle 102 or another data processing system 902, including one or more processors 210. It is noted that the method 1300 is merely an example, and is not intended to limit the present disclosure. Accordingly, it is understood that additional operations may be provided before, during, and after the method 1300 of FIG. 13, and that some other operations may only be briefly described herein.

The method 1300 includes operation 1302, of conveying, by a first transceiver, a signal to energize a second transceiver. The method 1300 includes operation 1304, of receiving from the second transceiver, first information associated with a trailer 302, the first information comprising an indication of a trailer wheelbase 334 and provided responsive to the signal. The method 1300 includes operation 1306, of adjusting by an autonomy system 114, a speed or direction of a vehicle responsive to the first information.

Referring again to operation 1302, the method 1300 includes conveying, by a first transceiver (e.g., a tractor transceiver 310), a signal to energize a second transceiver (e.g., a trailer transceiver 904). The signal can energize the second transceiver via an indication to wake, a request for a response, or so forth. In some embodiments the signal can include energy, which is harvested, by the second transceiver 904, to access a memory device 960 and provide the response to the signal (e.g., the second transceiver 904 and associated memory device 960 may be components of a passive device such as an RFID or passive NFC device). In some embodiments, a directionality, shielding (e.g., placement, relative to the fifth-wheel hitch 400), or the like can prevent wireless communication with other trailers 302, such as trailers 302 which are not rotatably coupled to the vehicle, such that either of the first transceiver or the second transceiver may be mute with respect to further devices. For example, the first transceiver and the second transceiver can have a range of less than a meter. In some embodiments, the first transceiver or the second transceiver can have a range of greater than about one meter, and may compare a signal strength or directionality to a threshold to avoid responding to any corresponding transceiver which has an energy level less than a threshold, as indicative that the transceiver is not associated with a coupled portion of the autonomous vehicle 102.

Referring again to operation 1304, the method 1300 includes receiving, from the second transceiver, first information associated with a trailer 302, the first information comprising an indication of a trailer wheelbase 334 and provided responsive to the signal. The information can include any of the tag data 928 such as various identifiers 962. Further, the information can include any information associated with a trailer 302 such as an age, manufacture date, maintenance history, mass density distribution, mass, moment of inertia, or any information of a load 802 associated with the trailer 302. Any information included in the tag data 928 can be retrieved from a server 122, such as a remote or local server 122. In some embodiments, the first transceiver can write, update, or modify information accessible to the second transceiver, or corresponding information at the server 122. For example, the tag data 928 can include a read only memory wherein the data processing system 902 can provide any updates or relevant data to the server 122, or can include a re-writable memory, whereupon the data processing system 902 can provide the updates locally to such a memory 960.

Referring again to operation 1306, the method 1300 includes adjusting, by an autonomy system, a speed or direction of a vehicle responsive to the first information. For example, the adjustment can be performed is described with regard to operation 1110 of FIG. 11 and the description associated therewith, as otherwise described herein, variants thereof, or the like.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

Various descriptions, herein, make use of the word "or" to refer to plurality alternative options. Such references are intended to convey an inclusive or. For example, various server 122 components herein can include hardware or software components. Such a disclosure indicates that the components may comprise a hardware component, a software component, or both a hardware and a software component.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A vehicle, comprising:
  one or more processors, configured to:
    receive a mass distribution for the vehicle, the mass distribution comprising:
      a mass of a tractor of the vehicle;
      a mass of a trailer of the vehicle; and
      a load mass; and
    determine a geometry of a plurality of points of support disposed along a longitudinal axis of the trailer by detecting a distance between a kingpin of the trailer and a wheel assembly of the trailer using a distance sensor;
    determine a center of mass of the trailer based on the mass distribution and the geometry of the plurality of points of support;
    determine, based on the geometry of the plurality of points of support and the center of mass, a moment of inertia of the trailer about at least one of the plurality of points of support; and
    perform a navigational action based on the moment of inertia.

2. The vehicle of claim 1, wherein the trailer mass is received as a mass density distribution along the longitudinal axis.

3. The vehicle of claim 1, wherein the navigational action is a speed restriction adopted responsive to the moment of inertia about a rotatable coupler exceeding a predetermined threshold.

4. The vehicle of claim 1, wherein the navigational action is performed based on:
   a coupling angle between the tractor and the trailer; and
   the moment of inertia.

5. The vehicle of claim 1, wherein the tractor mass comprises a variable weight of:
   a passenger mass, based on a detection of one or more occupancy sensors; or
   a fuel mass, based on based on a detection of one or more fuel sensors.

6. The vehicle of claim 1, wherein the mass distribution comprises a mass density function for the trailer, received from a data storage device coupled to the trailer.

7. The vehicle of claim 1, wherein the geometry comprises a distance between a rotatable coupler of the tractor and at least one of the plurality of points of support.

8. A method, comprising:
   receiving, by a data processing system, a mass distribution for a vehicle, the mass distribution comprising:
     a mass of a tractor of the vehicle;
     a mass of a trailer of the vehicle; and
     a load mass; and
   determining, by the data processing system, a geometry of a plurality of points of support disposed along a longitudinal axis of the trailer by detecting a distance between a kingpin of the trailer and a wheel assembly of the trailer using a distance sensor;
   determining, by the data processing system, a center of mass of the trailer based on the mass distribution and the geometry of the plurality of points of support;
   determining, by the data processing system, based on the geometry of the plurality of points of support and the center of mass, a moment of inertia of the trailer about at least one of the plurality of points of support; and
   performing, by the data processing system, a navigational action based on the moment of inertia.

9. The method of claim 8, comprising:
   receiving, by the data processing system, the trailer mass comprising a mass density distribution along the longitudinal axis.

10. The method of claim 8, wherein the navigational action comprises:
    adopting, by the data processing system, a speed restriction responsive to the moment of inertia about a rotatable coupler exceeding a predetermined threshold.

11. The method of claim 8, wherein the navigational action is performed based on:
    a coupling angle between the tractor and the trailer; and
    the moment of inertia.

12. The method of claim 8, wherein the tractor mass comprises a variable weight of:
    a passenger mass, based on a detection of one or more occupancy sensors; or
    a fuel mass, based on based on a detection of one or more fuel sensors.

13. The method of claim 8, wherein the method comprises:
    receiving, by the data processing system, the mass distribution comprising a mass density function for the trailer, from a data storage device coupled to the trailer.

14. The method of claim 8, wherein the geometry comprises a distance between a rotatable coupler of the tractor and at least one of the plurality of points of support.

15. A system comprising:
    a data processing system configured to:
      store a mass distribution for a tractor, the tractor mass distribution comprising:
        a fixed portion of the mass of the tractor;
        a first variable portion of the mass of the tractor associated with a combustible fuel; and
        a second variable portion of the mass of the tractor associated with an occupant thereof;
      store a mass distribution for a trailer, the trailer mass distribution comprising:
        a fixed portion of the mass of the trailer; and
        a variable portion of the mass of the trailer corresponding to a load;
      determine a geometry of a plurality of points of support disposed along a longitudinal axis of the trailer by detecting a distance between a kingpin of the trailer and a wheel assembly of the trailer using a distance sensor;
      determine a center of mass of the trailer based on the stored mass distribution for the tractor and the stored mass distribution for the trailer; and
      determine, based on the geometry of the plurality of points of support and the center of mass, a moment of inertia of the trailer about at least one of the plurality of points of support.

16. The system of claim 15, wherein the trailer is rotatably coupled to the tractor.

17. The system of claim 15, wherein the trailer mass is received as a mass density distribution along a longitudinal axis of the trailer.

18. The system of claim 15, wherein the data processing system is further configured to perform a navigational action based on the moment of inertia, wherein the navigational action is a speed restriction adopted responsive to the moment of inertia about a rotatable coupler exceeding a predetermined threshold.

* * * * *